United States Patent
Machida et al.

(10) Patent No.: US 7,623,328 B2
(45) Date of Patent: Nov. 24, 2009

(54) DRIVING CONTROL APPARATUS FOR MOTION MECHANISM AND CONTROL METHOD OF DRIVING CONTROL APPARATUS

(75) Inventors: Kenichi Machida, Isesaki (JP); Hidekazu Yoshizawa, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 33 days.

(21) Appl. No.: 11/047,588

(22) Filed: Feb. 2, 2005

(65) Prior Publication Data
US 2005/0185358 A1 Aug. 25, 2005

(30) Foreign Application Priority Data
Feb. 3, 2004 (JP) .............................. 2004-026220

(51) Int. Cl.
*H02H 7/08* (2006.01)
(52) U.S. Cl. ...................................................... 361/31
(58) Field of Classification Search ................ 361/93.1, 361/31
See application file for complete search history.

(56) References Cited

U.S. PATENT DOCUMENTS

| | | | | |
|---|---|---|---|---|
| 3,418,990 A * | 12/1968 | Lindell, Jr. ................... | 123/640 |
| 4,371,822 A | 2/1983 | Otsuka et al. ................ | 318/696 |
| 4,499,876 A | 2/1985 | Yamamoto ................... | 123/446 |
| 4,811,710 A | 3/1989 | Schmitt et al. .............. | 123/359 |
| 4,909,213 A * | 3/1990 | Mezger et al. ......... | 123/339.15 |
| 5,027,769 A * | 7/1991 | Yoshida et al. ............... | 123/399 |
| 5,031,595 A | 7/1991 | Heck et al. ............. | 123/339.15 |
| 5,303,156 A * | 4/1994 | Matsuoka et al. ............. | 701/43 |
| 5,500,565 A * | 3/1996 | Okubo ................... | 310/316.02 |
| 5,530,788 A * | 6/1996 | Saijima ....................... | 388/811 |
| 5,537,961 A | 7/1996 | Shigeru et al. ........... | 123/90.15 |
| 5,669,353 A * | 9/1997 | Shirai et al. .................. | 123/399 |
| 5,727,516 A | 3/1998 | Augustin et al. ............. | 123/198 |
| 5,747,955 A * | 5/1998 | Rotunda et al. .............. | 318/434 |
| 5,764,023 A * | 6/1998 | Wieloch ...................... | 318/803 |
| 6,057,609 A * | 5/2000 | Nagai et al. ................... | 307/66 |
| 6,107,926 A * | 8/2000 | Kifuku et al. ............... | 340/650 |
| 6,382,175 B1 | 5/2002 | van der Staay et al. | |
| 6,384,512 B1 | 5/2002 | Maeda .................. | 310/316.03 |
| 6,390,044 B2 | 5/2002 | Yoshizawa et al. | |
| 6,422,185 B1 | 7/2002 | Duesmann et al. | |
| 6,435,149 B2 * | 8/2002 | Moriya et al. ............ | 123/90.18 |
| 6,588,260 B1 | 7/2003 | Pursifull ..................... | 73/118.1 |
| 6,615,090 B1 * | 9/2003 | Blevins et al. ................ | 700/26 |

(Continued)

FOREIGN PATENT DOCUMENTS

DE 198 50 107 A1 5/2000

(Continued)

OTHER PUBLICATIONS

Japanese Office Action for corresponding Japanese Patent Application No. 2004-026220, mailed Jun. 24, 2008.

*Primary Examiner*—Stephen W Jackson
*Assistant Examiner*—Ann T Hoang
(74) *Attorney, Agent, or Firm*—Foley & Lardner LLP

(57) ABSTRACT

When a variable valve mechanism which varies an opening characteristic of an engine valve is malfunctioned, the power supply to a drive circuit for the variable valve mechanism is stopped, and also a control signal to the drive circuit is cleared.

6 Claims, 21 Drawing Sheets

U.S. PATENT DOCUMENTS

| | | | |
|---|---|---|---|
| 6,874,468 B2 * | 4/2005 | Watanabe | 123/377 |
| 7,039,515 B2 * | 5/2006 | Eich et al. | 701/51 |
| 2001/0013324 A1 | 8/2001 | Yoshizawa et al. | |
| 2003/0080306 A1 | 5/2003 | Yoeda et al. | |
| 2003/0136361 A1 | 7/2003 | Ogiso | |
| 2003/0205977 A1 | 11/2003 | Itabashi et al. | 318/434 |
| 2004/0003957 A1 * | 1/2004 | Matsuoka et al. | 180/446 |
| 2004/0107928 A1 * | 6/2004 | Asada et al. | 123/90.16 |

FOREIGN PATENT DOCUMENTS

| | | |
|---|---|---|
| EP | 0 024 531 A2 | 3/1981 |
| EP | 1 061 238 A2 | 12/2000 |
| EP | 1 069 298 A1 | 1/2001 |
| EP | 1 375 883 A2 | 1/2004 |
| GB | 2 281 954 A | 3/1995 |
| JP | 09066880 A * | 3/1997 |
| JP | 2000152415 A * | 5/2000 |
| JP | 2000324615 A * | 11/2000 |
| JP | 2001-164950 | 6/2001 |
| JP | 2001-254637 A | 9/2001 |
| WO | WO 00/26523 A1 | 5/2000 |

* cited by examiner

DRIVING CONTROL APPARATUS FOR MOTION MECHANISM AND CONTROL METHOD OF DRIVING CONTROL APPARATUS

BACKGROUND OF THE INVENTION

1. Field of the Invention

The present invention relates to a driving control apparatus for a motion mechanism which is operated by an electric actuator, for example, a variable valve lift mechanism which varies a lift amount of an engine valve and the like, and a control method of the driving control apparatus.

2. Description of the Related Art

Japanese Unexamined Patent Publication No. 2001-254637 discloses a driving control apparatus for a variable valve lift mechanism which varies a lift amount of an engine valve.

In the above driving control apparatus, it is diagnosed whether or not the variable valve lift mechanism is malfunctioned, and the malfunction of the variable valve lift mechanism is detected, the power distribution to an oil control valve (electric actuator) of the variable valve lift mechanism is stopped, thereby fixing the lift amount of the engine valve at a minimum.

However, even if a command for shutting off the power distribution to the electric actuator is output when it is detected that the variable valve lift mechanism is malfunctioned, there is a case where the lift amount of the engine valve cannot be fixed at a minimum if a drive circuit for the electric actuator is malfunctioned.

Further, in a variable valve lift mechanism which uses a motor as the electric actuator, the motor needs to generate a large torque against a cam reaction force. Therefore, if the power distribution to the motor continues for an extraordinary long period of time due to the malfunction of the drive circuit, the motor is failed.

SUMMARY OF THE INVENTION

It is therefore an object of the present invention to reliably stop the driving of an electric actuator, when a motion mechanism operated by the electric actuator is malfunctioned.

In order to achieve the above object, according to the present invention, when it is detected that a motion mechanism is malfunctioned, the power supply to a drive circuit for an electric actuator is stopped.

The other objects and features of the invention will become understood from the following description with reference to the accompanying drawings.

PREFERRED EMBODIMENTS

Figure 1:
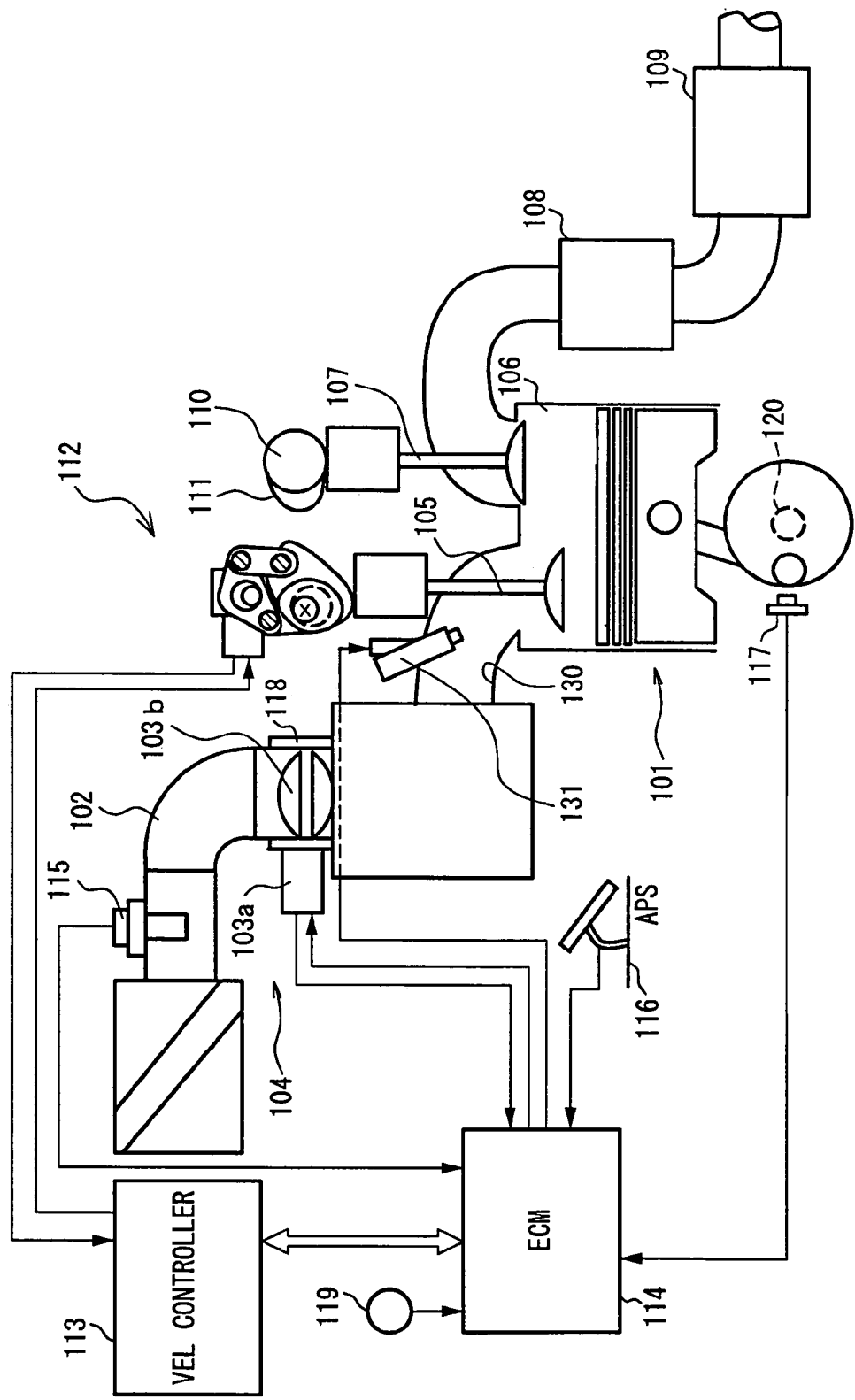
FIG. 1 is a systematic diagram of an engine in an embodiment.

FIG. 1 is a systematic diagram of a vehicle engine in an embodiment of the present invention.

In FIG. 1, in an intake pipe 102 of an internal combustion engine 101 of a vehicle, an electronically controlled throttle 104 is disposed.

Electronically controlled throttle 104 is a device for driving a throttle valve (intake throttle valve) 103b to open and close by a throttle motor 103a (actuator).

Then, air is sucked into a combustion chamber 106 of engine 101 via electronically controlled throttle 104 and an intake valve 105.

A combusted exhaust gas is discharged from combustion chamber 106 via an exhaust valve 107, and thereafter, is purified by a front catalyst 108 and a rear catalyst 109, to be emitted into the atmosphere.

Exhaust valve 107 is driven by a cam 111 axially supported by an exhaust side camshaft 110, to open and close, while maintaining a predetermined lift amount, a predetermined valve operating angle and a predetermined valve timing.

On the other hand, there is disposed a variable valve event and lift (VEL) mechanism 112 which continuously varies a lift amount of intake valve 105 as well as an operating angle thereof.

VEL mechanism 112 described above is equivalent to a motion mechanism in the present embodiment.

As a control unit, there are disposed an engine control module (ECM) 114 and a VEL controller 113.

ECM 114 and VEL controller 113 can communicate with each other.

VEL mechanism 112 is controlled by VEL controller 113.

ECM 114 receives detection signals from various sensors which detects driving conditions of the engine and the vehicle.

As the various sensors, there are disposed an air flow meter 115 detecting an intake air flow amount of engine 101, an accelerator opening sensor 116 detecting an accelerator opening, a crank angle sensor 117 taking a crank rotation signal out of crankshaft 120, a throttle sensor 118 detecting an opening degree TVO of throttle valve 103b and a water temperature sensor 119 detecting a cooling water temperature of engine 101.

Further, a fuel injection valve 131 is disposed on an intake port 130 at the upstream side of intake valve 105.

Fuel injection valve 131 is driven to open based on an injection pulse signal from ECM 114 to inject fuel of an amount proportional to the injection pulse width (valve opening time) of the injection pulse signal.

Figure 2:
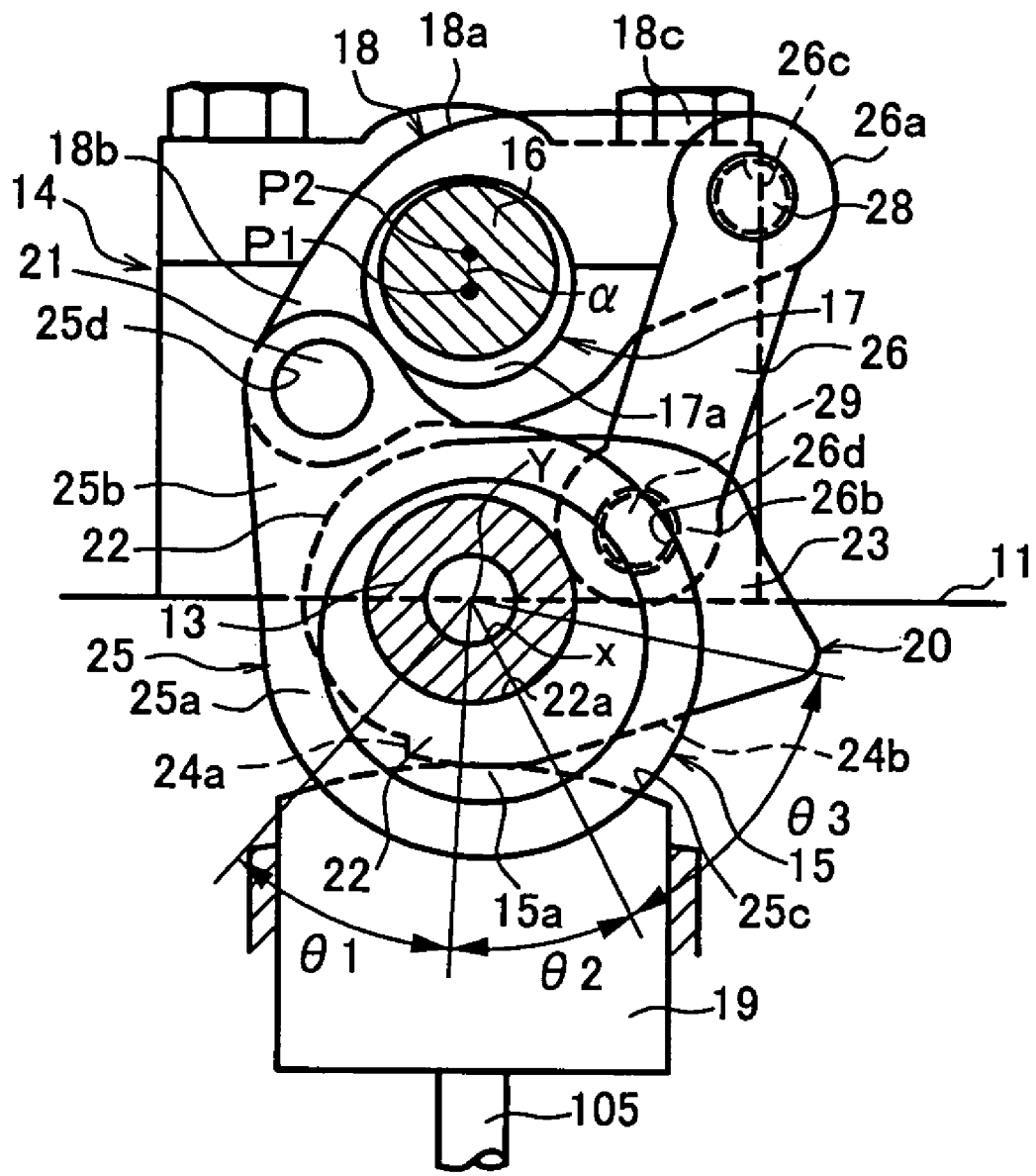
FIG. 2 is a cross section view showing a variable valve event and lift mechanism in the embodiment (A-A cross section view in FIG. 3).
Figure 3:
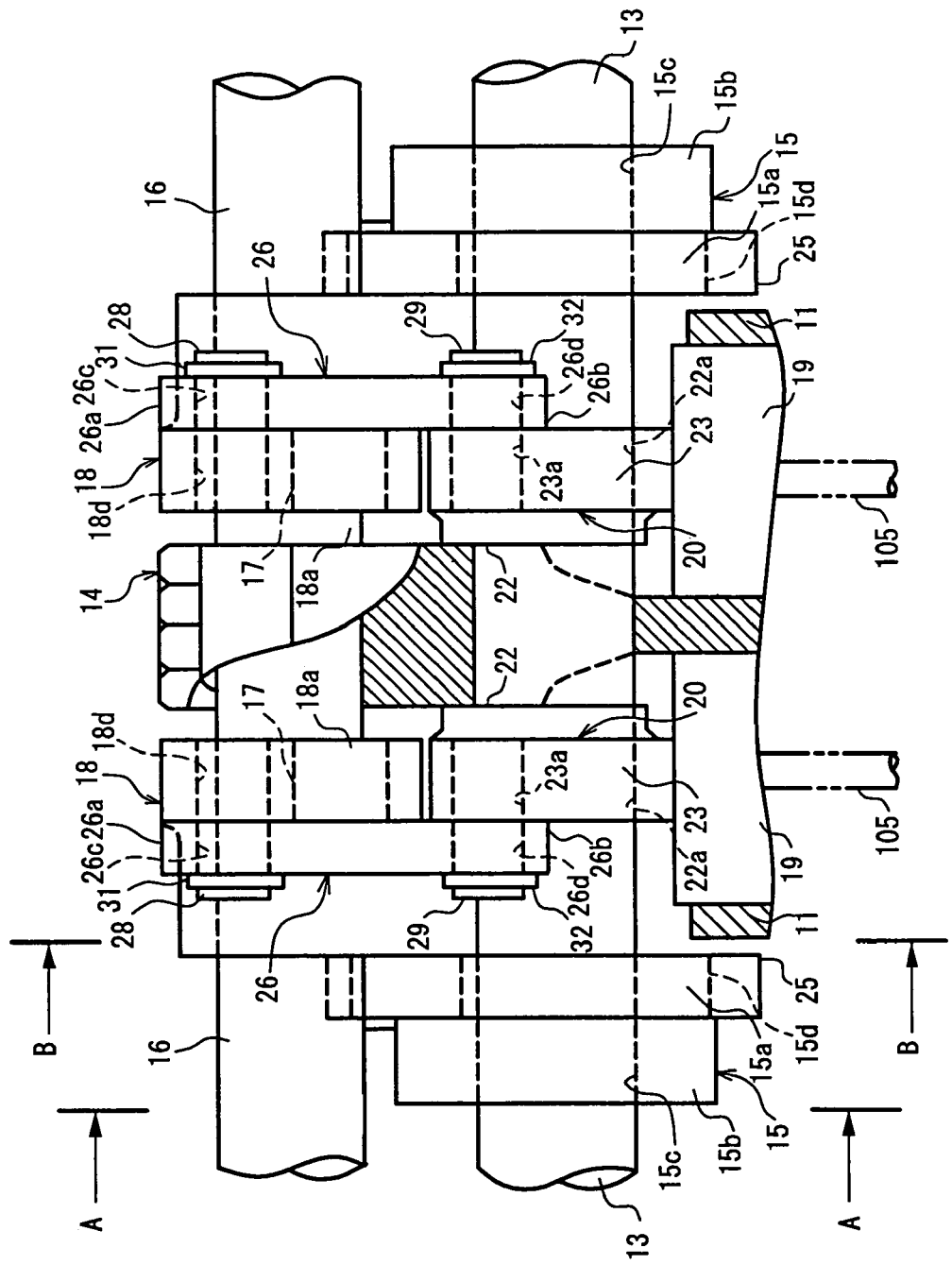
FIG. 3 is a side elevation view of the variable valve event and lift mechanism.
Figure 4:
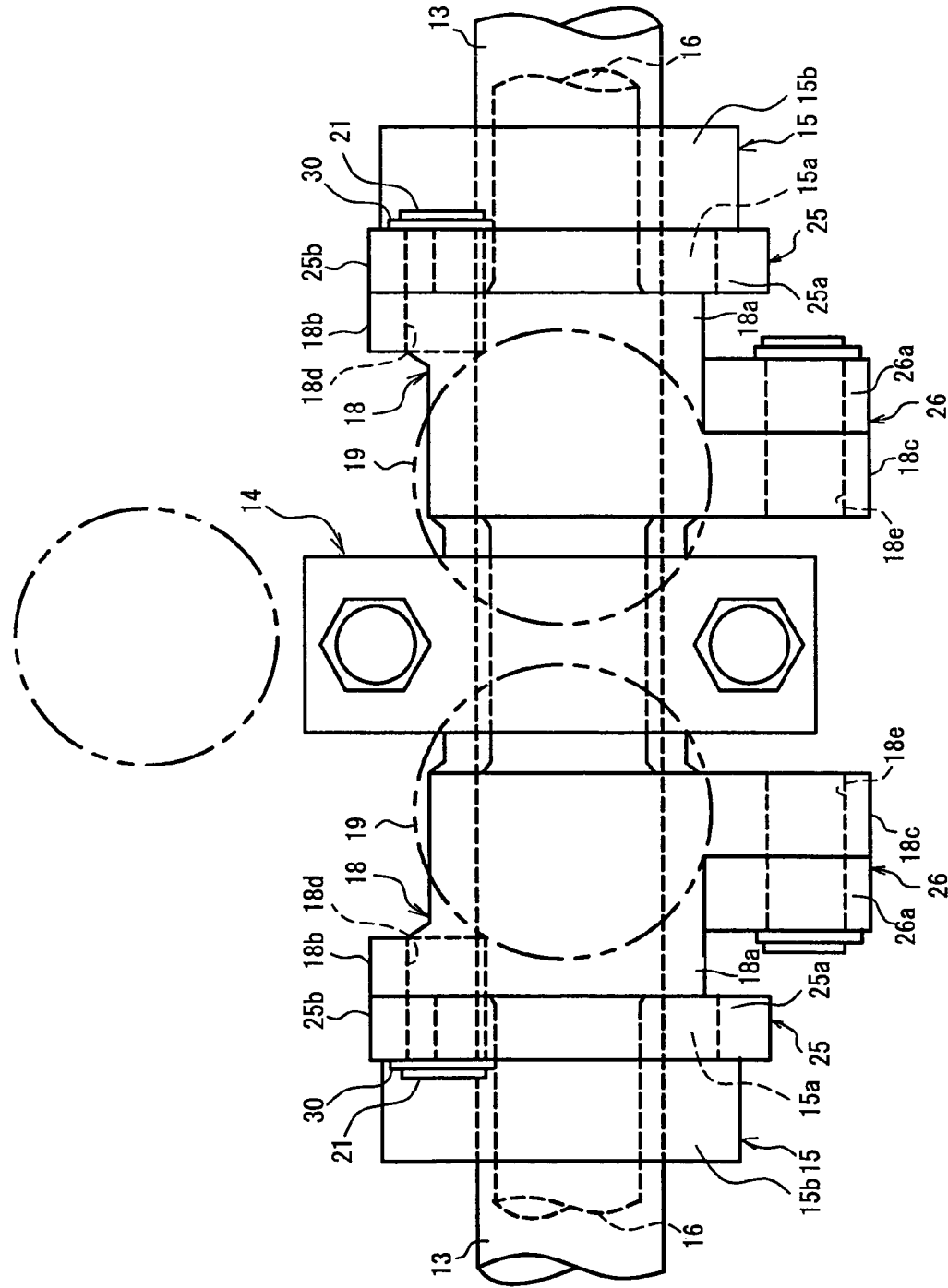
FIG. 4 is a top plan view of the variable valve event and lift mechanism.

FIG. 2 to FIG. 4 show in detail the structure of VEL mechanism 112.

VEL mechanism 112 shown in FIG. 2 to FIG. 4 includes a pair of intake valves 105, 105, a hollow camshaft 13 rotatably supported by a cam bearing 14 of a cylinder head 11, two eccentric cams 15, 15 (drive cams) being rotation cams which are axially supported by camshaft 13, a control shaft 16 rotatably supported by cam bearing 14 and arranged in parallel at an upper position of camshaft 13, a pair of rocker arms 18, 18 swingingly supported by control shaft 16 through a control cam 17, and a pair of independent swing cams 20, 20 disposed to upper end portions of intake valves 105, 105 through valve lifters 19, 19, respectively.

Eccentric cams 15, 15 are connected with rocker arms 18, 18 by link arms 25, 25, respectively. Rocker arms 18, 18 are connected with swing cams 20, 20 by link members 26, 26.

Rocker arms 18, 18, link arms 25, 25, and link members 26, 26 constitute a transmission mechanism.

Figure 5:
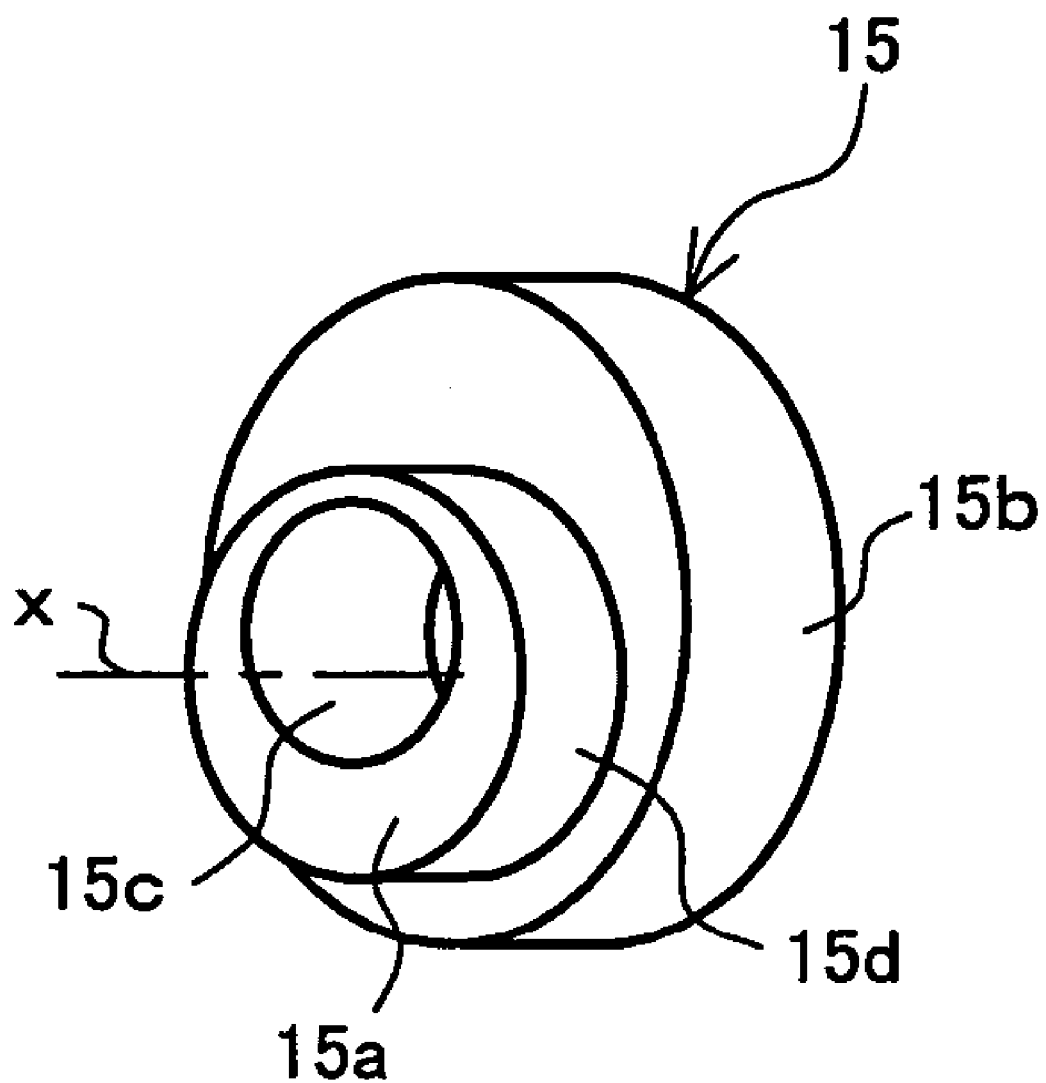
FIG. 5 is a perspective view showing an eccentric cam for use in the variable valve event and lift mechanism.

Each eccentric cam 15, as shown in FIG. 5, is formed in a substantially ring shape and includes a cam body 15a of small diameter, a flange portion 15b integrally formed on an outer surface of cam body 15a. A camshaft insertion hole 15c is formed through the interior of eccentric cam 15 in an axial direction thereof, and also a center axis X of the cam body 15a is biased from a center axis Y of camshaft 13 by a predetermined distance.

Eccentric cams 15, 15 are pressed and fixed to camshaft 13 via camshaft insertion holes 15c at outsides of valve lifters 19, 19, respectively, so as not to interfere with valve lifters 19, 19.

Each rocker arm 18, as shown in FIG. 4, is bent and formed in a substantially crank shape, and a central base portion 18a thereof is rotatably supported by control cam 17.

A pin hole 18d is formed through one end portion 18b which is formed to protrude from an outer end portion of base portion 18a. A pin 21 to be connected with a tip portion of link arm 25 is pressed into pin hole 18d. A pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to an outer periphery of control shaft 16. As shown in FIG. 2, a center axis P1 position of control cam 17 is biased from a center axis P2 position of control shaft 16 by α.

Figure 6:
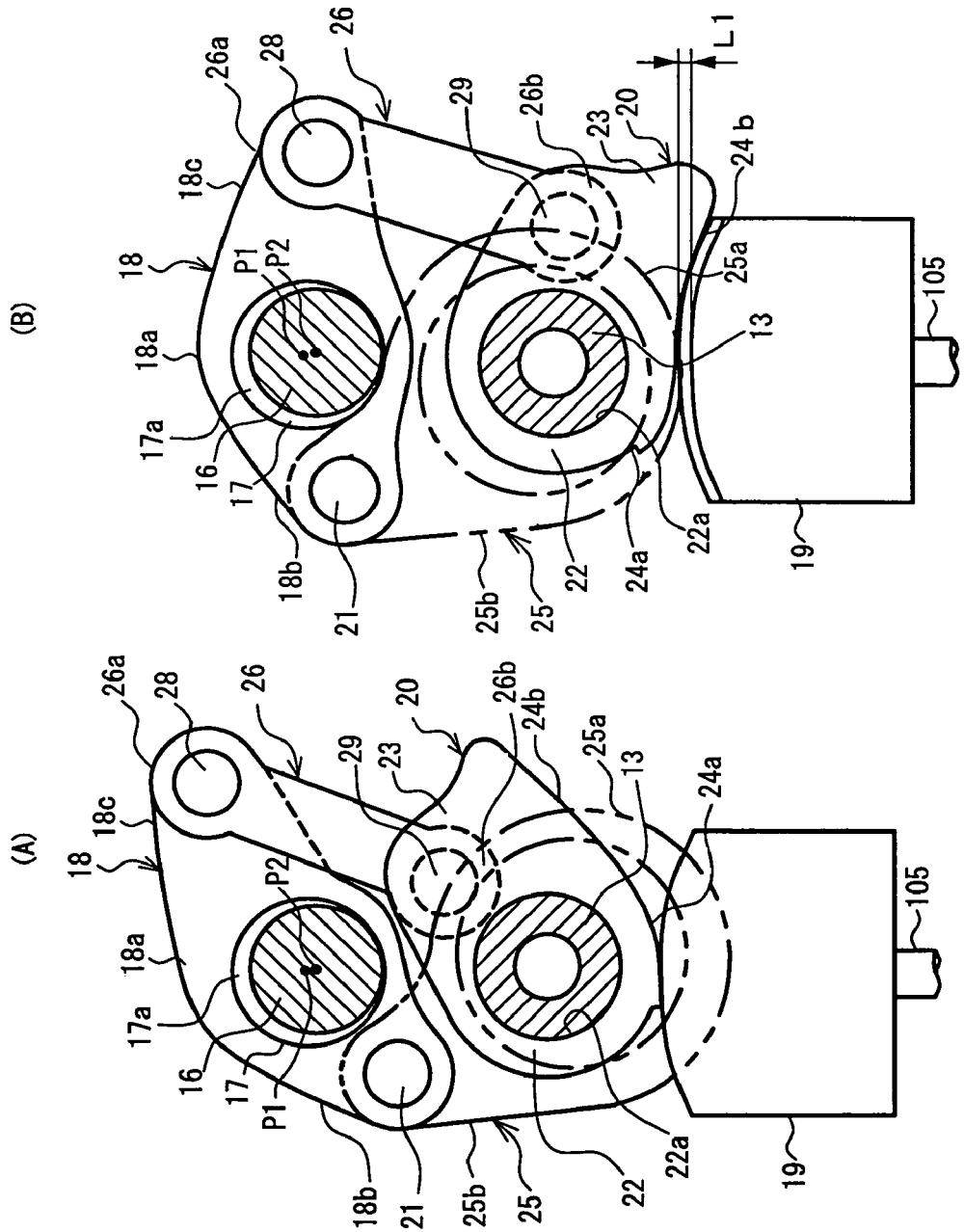
FIG. 6 is a cross section view showing a low lift control condition of the variable valve event and lift mechanism (B-B cross section view of FIG. 3).
Figure 7:
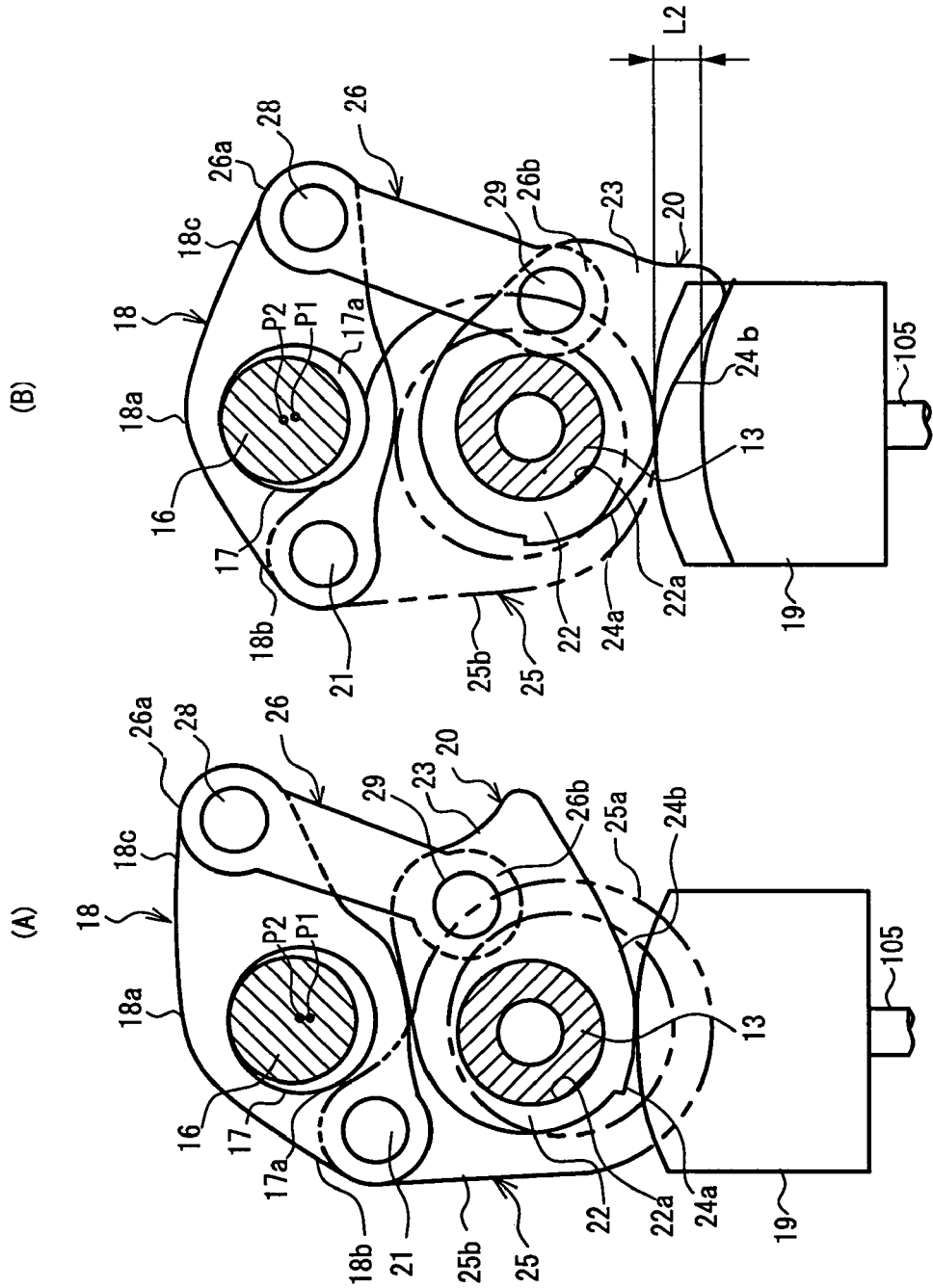
FIG. 7 is a cross section view showing a high lift control condition of the variable valve event and lift mechanism (B-B cross section view of FIG. 3).

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into supporting hole 22a to be rotatably supported. Also, a pin hole 23a is formed through an end portion 23 positioned at the other end portion 18c of rocker arm 18.

A base circular surface 24a at a side of base end portion 22 and a cam surface 24b extending in an arc shape from base circular surface 24a to an edge of end portion 23, are formed on a bottom surface of swing cam 20. Base circular surface 24a and the cam surface 24b are in contact with a predetermined position of an upper surface of each valve lifter 19 corresponding to a swing position of swing cam 20.

Figure 8:
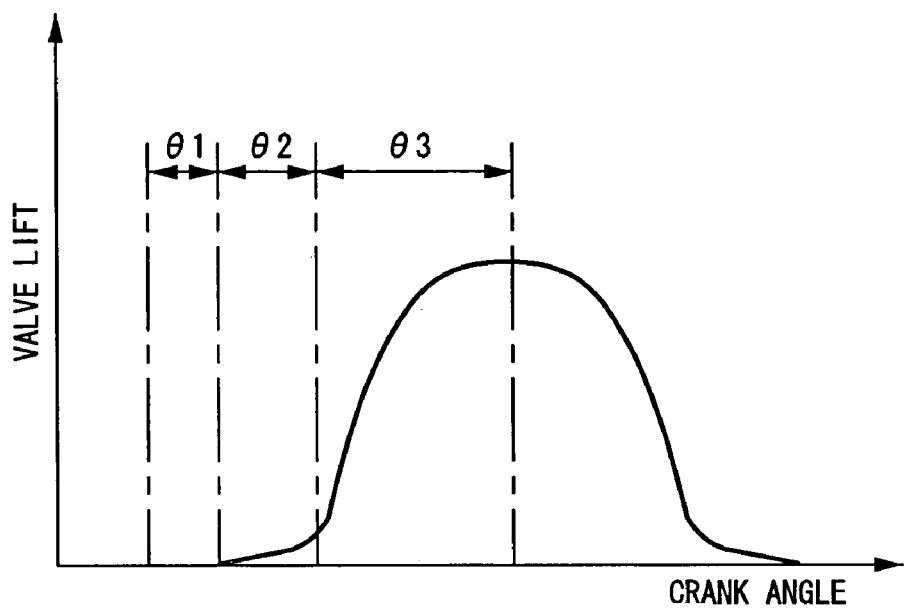
FIG. 8 is a graph showing a lift characteristic of an intake valve in the variable valve characteristic mechanism.

Namely, according to a valve lift characteristic shown in FIG. 8, as shown in FIG. 2, a predetermined angle range θ1 of base circular surface 24a is a base circle interval and a range of from base circle interval θ1 of cam surface 24b to a predetermined angle range θ2 is a so-called ramp interval, and a range of from ramp interval θ2 of cam surface 24b to a predetermined angle range θ3 is a lift interval.

Link arm 25 includes a ring-shaped base portion 25a and a protrusion end 25b protrudingly formed on a predetermined position of an outer surface of base portion 25a. A fitting hole 25c to be rotatably fitted with the outer surface of cam body 15a of eccentric cam 15 is formed on a central position of base portion 25a. Also, a pin hole 25d into which pin 21 is rotatably inserted is formed through protrusion end 25b.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d.

Snap rings 30, 31, 32 restricting axial transfer of link arm 25 and link member 26 are disposed on respective end portions of pins 21, 28, 29.

In such a constitution, depending on a positional relation between the center axis P2 of control shaft 16 and the center axis P1 of control cam 17, as shown in FIG. 6 and FIG. 7, the valve lift amount is varied, and by driving control shaft 16 to rotate, the position of the center axis P2 of control shaft 16 relative to the center axis P1 of control cam 17 is changed.

Figure 9:
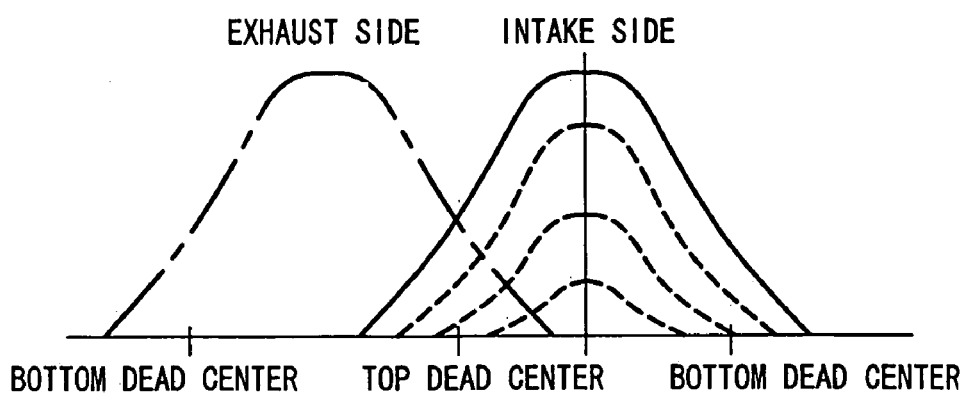
FIG. 9 is a graph showing a correlation between valve timing and a lift amount in the variable valve event and lift mechanism.
Figure 10:
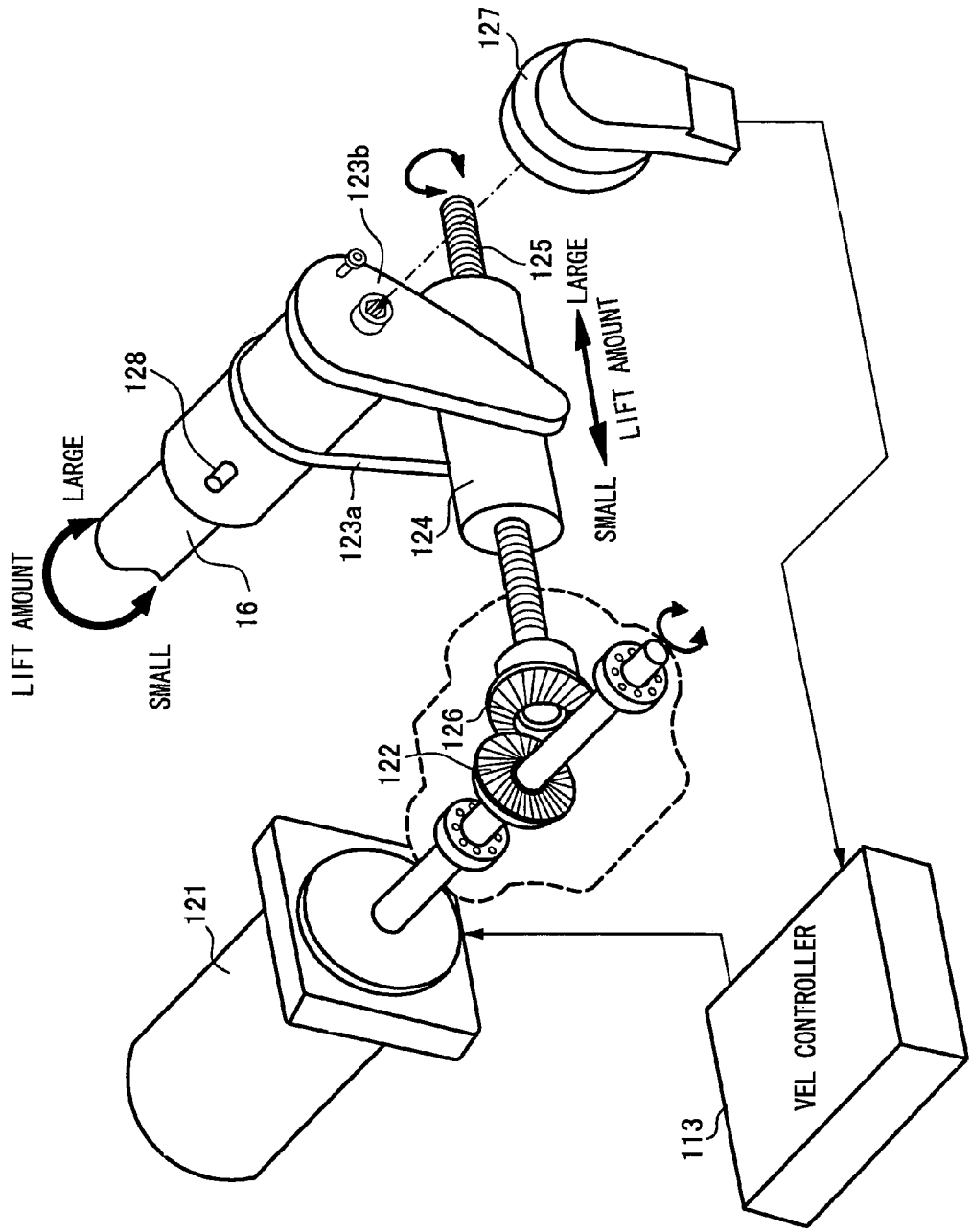
FIG. 10 is a perspective view showing a driving mechanism of a control shaft in the variable valve event and lift mechanism.

Control shaft 16 is driven to rotate within a predetermined rotation angle range, which is restricted by a stopper, by a DC servo motor (actuator) 121 as shown in FIG. 10. By varying a rotation angle of control shaft 16 by actuator 121, the lift amount and operating angle of each of intake valves 105, 105 are continuously varied within a variable range between a maximum valve lift amount and a minimum valve lift amount, which is restricted by the stopper (refer to FIG. 9).

In FIG. 10, DC servo motor 121 is arranged so that a rotation shaft thereof is parallel to control shaft 16, and a bevel gear 122 is axially supported by a tip portion of the rotation shaft.

On the other hand, a pair of stays 123a, 123b is fixed to the tip end of control shaft 16. A nut 124 is swingingly supported around an axis parallel to control shaft 16 connecting tip portions of the pair of stays 123a, 123b.

A bevel gear 126 meshed with bevel gear 122 is axially supported at a tip end of a threaded rod 125 engaged with nut 124. Threaded rod 125 is rotated by the rotation of DC servo motor 121, and the position of nut 124 engaged with threaded rod 125 is displaced in an axial direction of threaded rod 125, so that control shaft 16 is rotated.

Here, the valve lift amount is decreased as the position of nut 124 approaches bevel gear 126, while the valve lift amount is increased as the position of nut 124 gets away from bevel gear 126.

Further, a potentiometer type angle sensor 127 detecting the angle of control shaft 16 is disposed on the tip end of control shaft 16, as shown in FIG. 10. VEL controller 113 feedback controls DC servo motor 121 so that an actual angle detected by angle sensor 127 coincides with a target angle (a value equivalent to the target lift amount).

A stopper member 128 is formed to protrude from the outer periphery of control shaft 16.

When stopper member 128 is in contact with a receiving member on the fixing side (not shown in the figure) in both of a valve lift amount increasing direction and a valve lift amount decreasing direction, the rotation range (variable range of the valve lift amount) of control shaft 16 is restricted.

Figure 11:
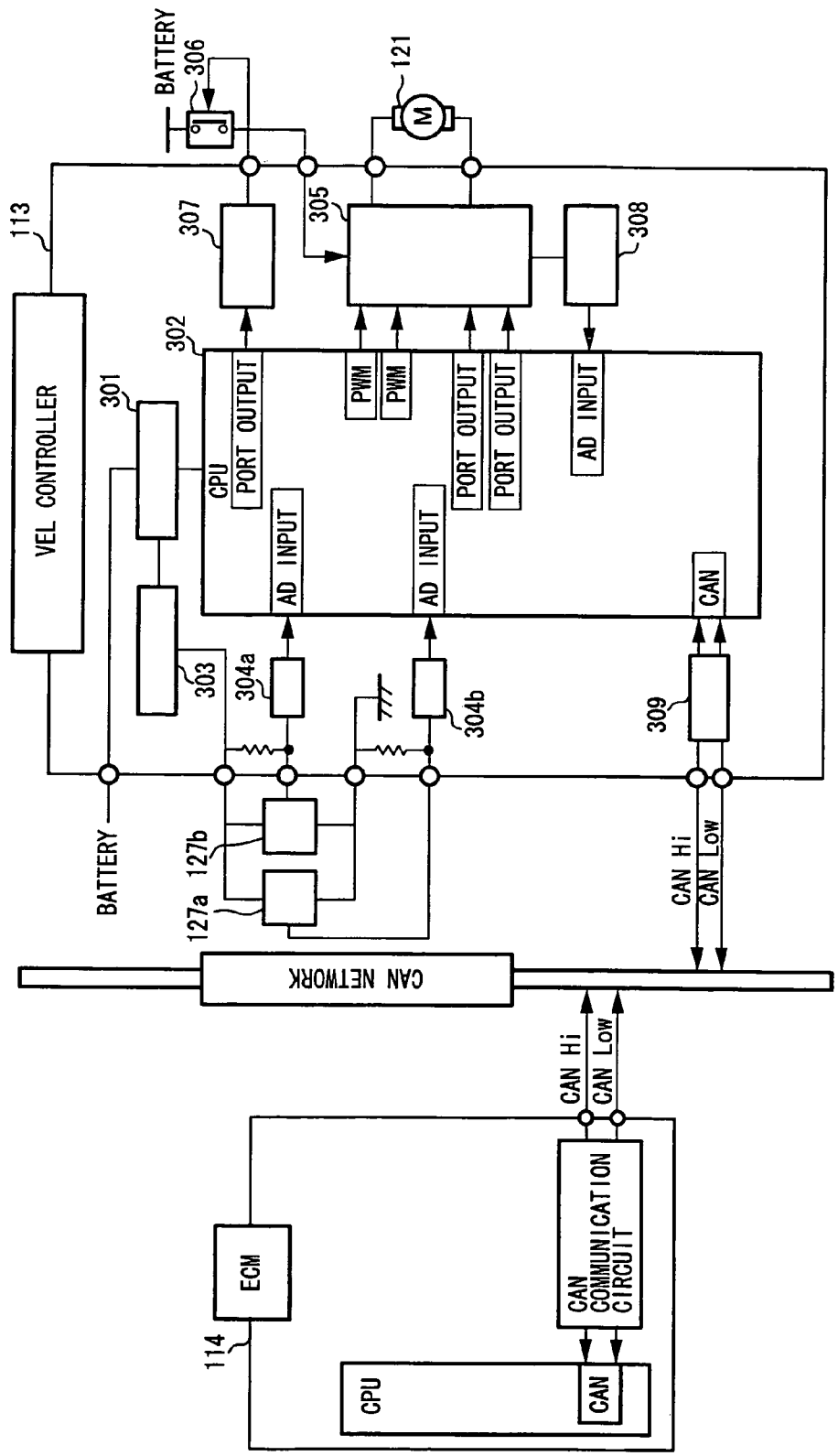
FIG. 11 is a circuit block diagram showing a first embodiment of a VEL controller.

FIG. 11 shows a configuration of VEL controller 113.

A battery voltage is supplied to VEL controller 113, and the power is supplied to a CPU 302 via a power supply circuit 301.

Further, a power supply voltage from power supply circuit 301 is supplied to angle sensors 127a, 127b via a power supply buffer circuit 303.

Output signals from angle sensors 127a, 127b are read in CPU 302 via input circuits 304a, 304b.

Further, there is disposed a motor drive circuit 305 for driving DC servo motor 121.

Motor drive circuit 305 is a PWM system drive circuit which varies the pulse width of a pulse signal for turning ON/OFF a driving power source for DC servo motor 121 based on a direct current level of a control signal (pulse width modulated signal PWM) output from CPU 302, which varies the ON duty of the pulse signal to control an average voltage of DC servo motor 121.

In order to drive DC servo motor 121 in a normal rotation direction and in a reverse rotation direction, control signals for normal and reverse rotations are input to motor drive circuit 305 from CPU 302, other than the pulse width modulated signal PWM.

A battery voltage is supplied to motor drive circuit 305 via a relay circuit 306, and relay circuit 306 is turned ON/OFF by a relay drive circuit 307 which is controlled based on a port output from CPU 302.

Further, there is disposed a current detection circuit 308 which detects a current of DC servo motor 121.

Moreover, VEL controller 113 is provided with a communication circuit 309 for communicating between VEL controller 113 and ECM 114.

Next, there will be described a driving control and a fail-safe control of VEL mechanism 112 (DC servo motor 121) by VEL controller 113, in accordance with flowcharts in FIG. 12 to FIG. 14.

Figure 12:
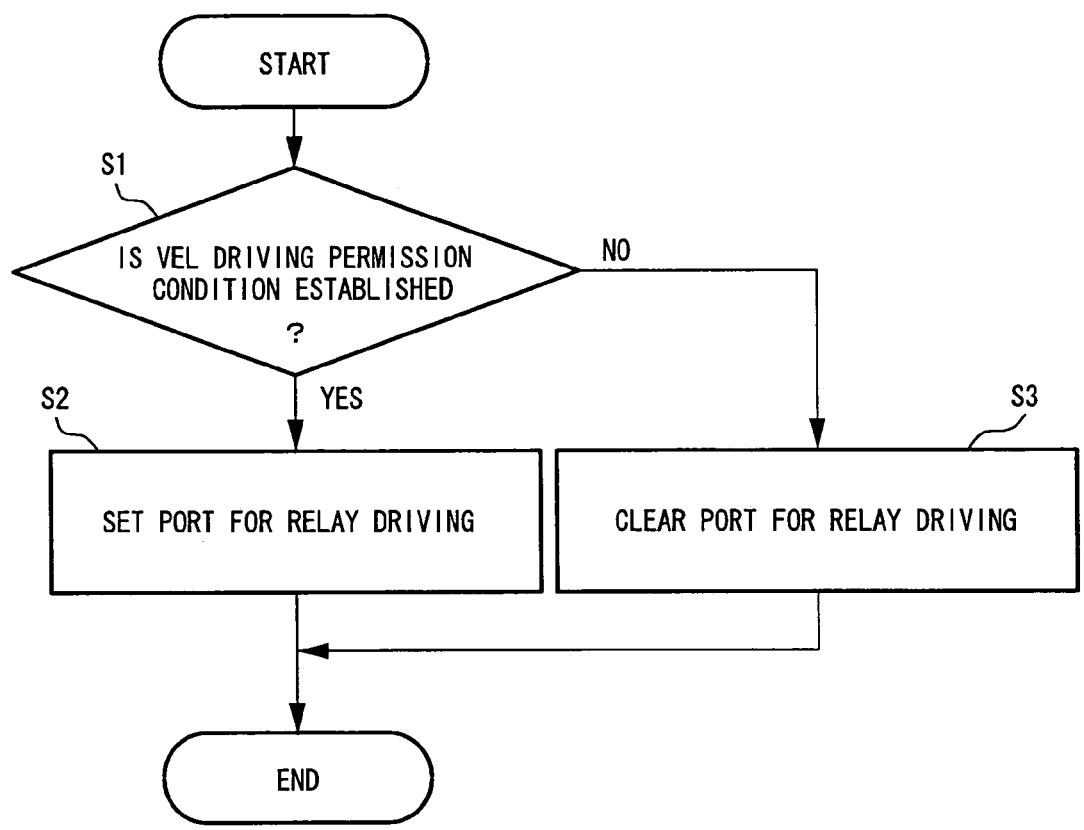
FIG. 12 is a flowchart showing a control of a relay circuit.

The flowchart in FIG. 12 shows the control of relay circuit 306. In step S1, it is judged whether or not a driving permission condition of VEL mechanism 112 is established.

When the permission condition is established, control proceeds to step S2, where the output port for relay driving in CPU 302 is set. As a result, relay circuit 306 is turned ON so that the battery voltage is supplied to motor drive circuit 305.

On the other hand, when the permission condition is not established, control proceeds to step S3, where the output port for relay driving is cleared. As a result, relay circuit 306 is turned OFF so that the supply of battery voltage to motor drive circuit 305 is shut off.

Figure 13:
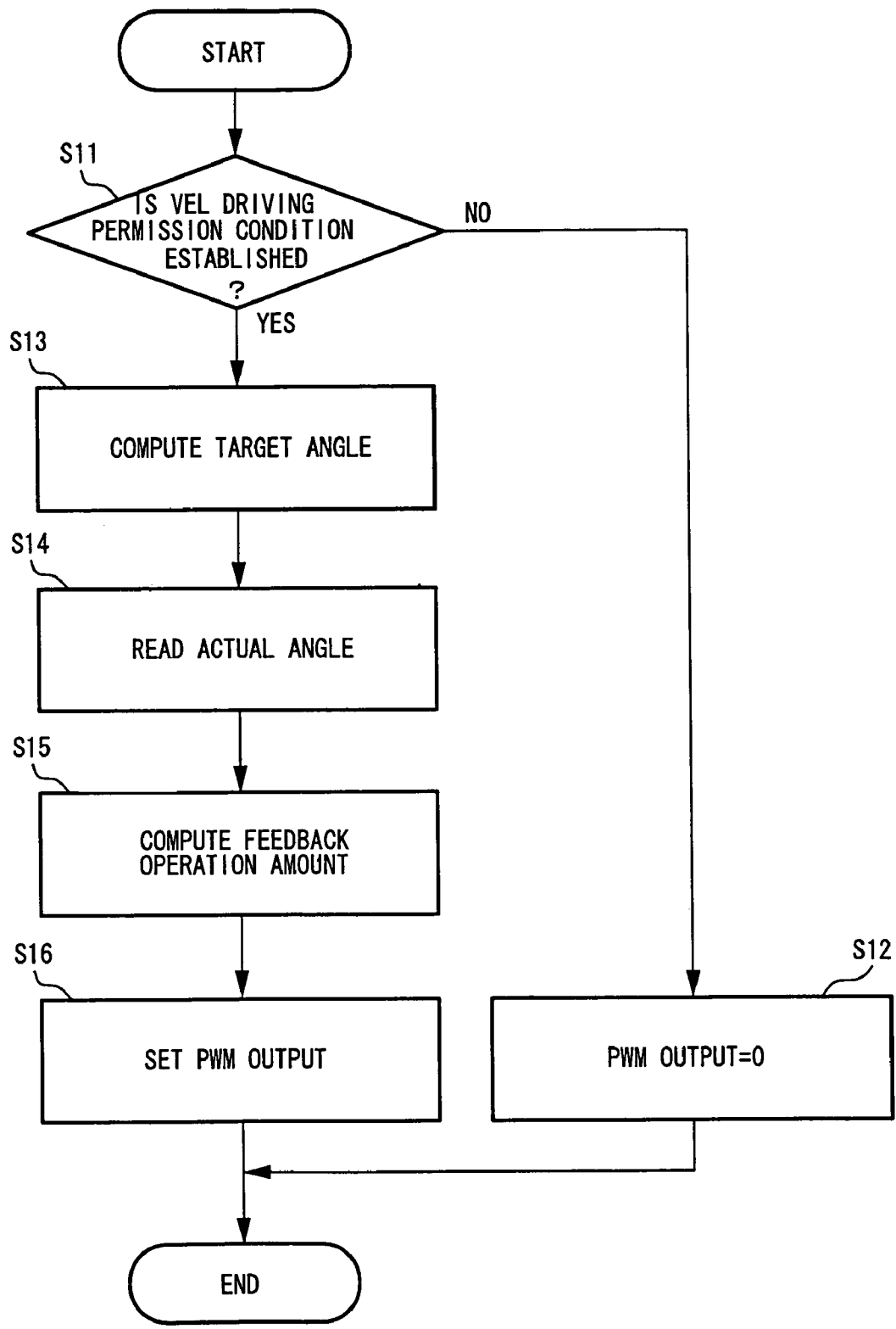
FIG. 13 is a flowchart showing a feedback control of the variable valve event and lift mechanism.

The flowchart in FIG. 13 shows the feedback control of DC servo motor 121 (electric actuator). In step S11, it is judged whether or not the driving permission condition of VEL mechanism 112 is established.

When the permission condition is not established, control proceeds to step S12, where the pulse width modulated signal PWM is made to be zero, to stop the driving of DC servo motor 121.

On the other hand, when the permission condition is established, control proceeds to step S13, where the target angle (target VEL angle) of control shaft 16 is computed.

Note, VEL controller 113 can read therein data of target angle computed by ECM 114.

In step S14, the actual angle of control shaft 16 is detected based on the output signal from angle sensor 127.

In step S15, a feedback operation amount is computed based on the deviation between the target angle and the actual angle.

In step S16, the pulse width modulated signal PWM to be output to motor drive circuit 305 is set based on the computation result in step S15.

Figure 14:
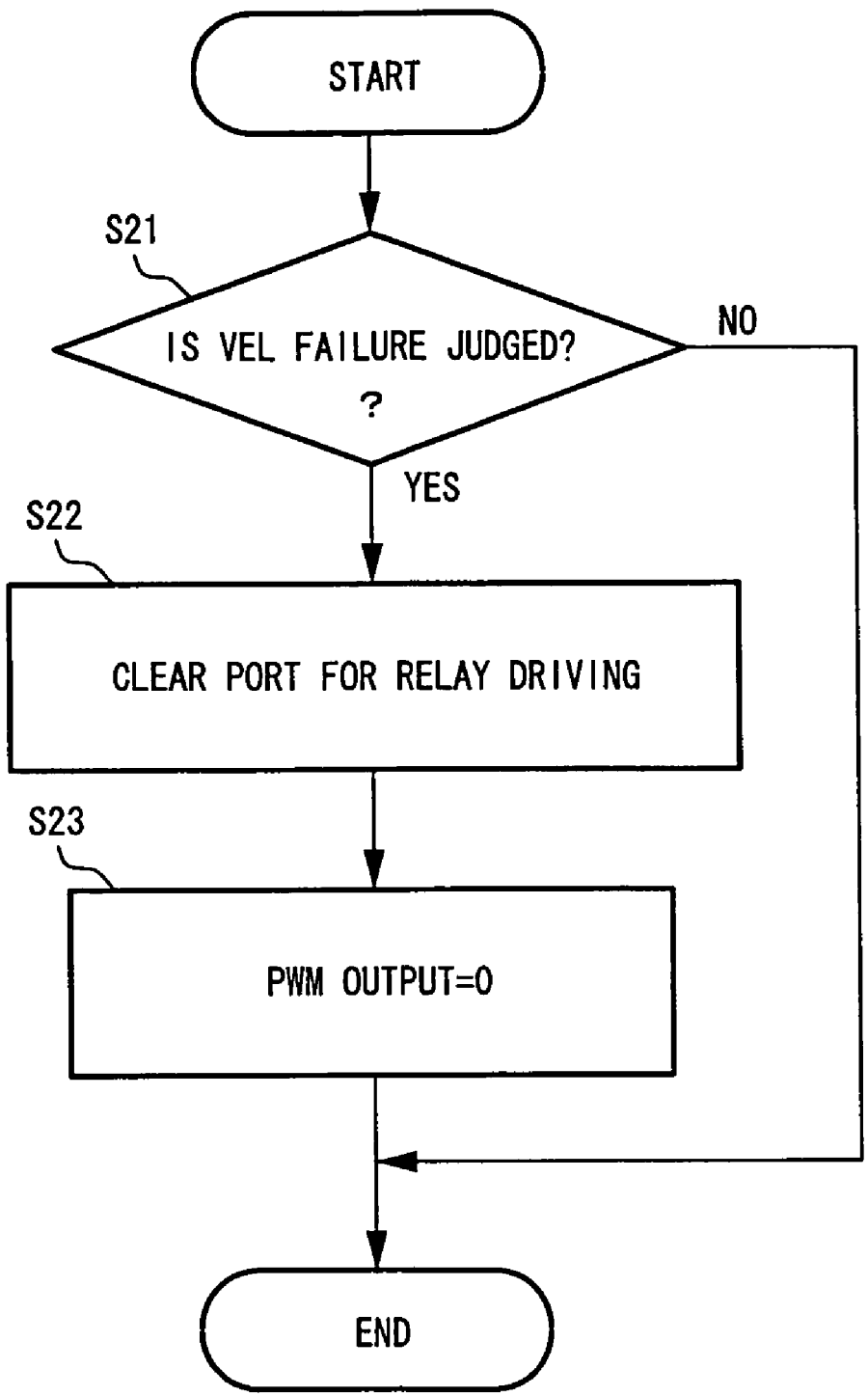
FIG. 14 is a flowchart showing a control at the time when the variable valve event and lift mechanism is failed.

The flowchart in FIG. 14 shows the fail-safe control at the time when VEL mechanism 112 is failed.

In step S21, it is determined whether or not the failure of VEL mechanism 112 is judged.

The failure diagnosis of VEL mechanism 112 is performed based on the deviation between the target angle and the actual angle, the current of DC servo motor 121 detected by current detection circuit 308, the driving duty of DC servo motor 121 and the like.

When it is determined in step S21 that the failure of VEL mechanism 112 is judged, control proceeds to step S22, where the output port for relay driving in CPU 302 is cleared. As a result, relay circuit 306 is turned OFF so that the supply of battery voltage (power supply voltage) to motor drive circuit 305 is shut off.

Further, in next step S23, the direct current level of the pulse width modulated signal PWM is made to be zero, to avoid the generation of pulse signal (ON signal of DC servo motor 121), so that the operation of DC servo motor 121 can be stopped even if relay circuit 306 is failed.

Figure 15:
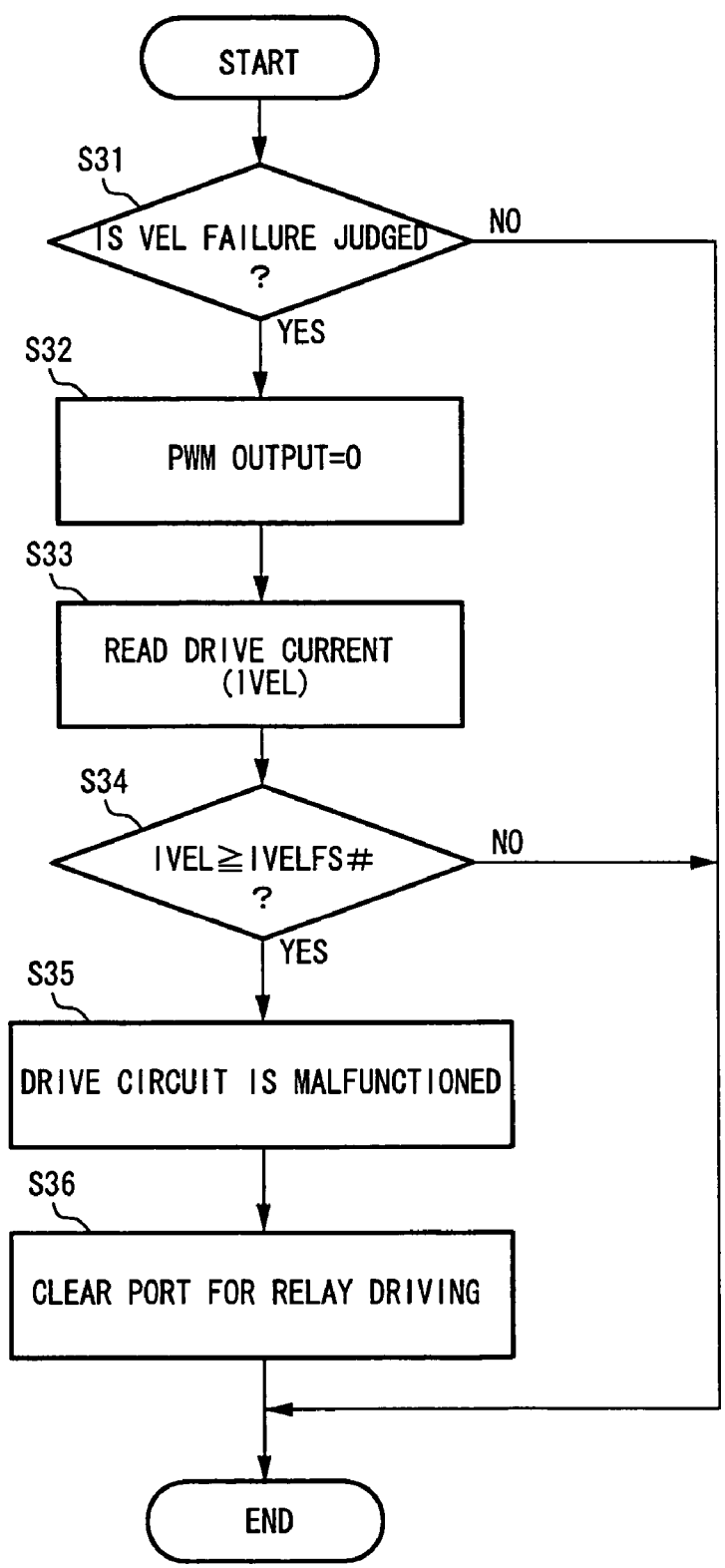
FIG. 15 is a flowchart showing another example of the control at the time when the variable valve event and lift mechanism is failed.

A flowchart in FIG. 15 shows another embodiment of the fail-safe control.

In step S31, it is determined whether or not the failure of VEL mechanism 112 is judged.

When it is determined in step S31 that the failure of VEL mechanism 112 is judged, control proceeds to step S32, where the pulse width modulated signal PWM is made to be zero.

Further, in next step S33, a current IVEL of DC servo motor 121 detected by current detection circuit 308 is read.

Then, in step S34, it is judged whether or not the current IVEL is equal to or higher than a reference current IVELFS#.

Here, if it is judged that the current IVEL of DC servo motor 121 is equal to or higher than the reference current IVELFS#, control proceeds to step S35, where it is judged that motor drive circuit 305 is malfunctioned.

Namely, since the pulse width modulated signal PWM has been made to be zero in step S32, the current IVEL of DC servo motor 121 should be zero under normal circumstances. Therefore, when the current IVEL is equal to or higher than the reference current IVELFS#, motor drive circuit 305 supplies to DC servo motor 121 a drive current which does not correspond to the pulse width modulated signal PWM.

When it is judged in step S35 that motor drive circuit 305 is malfunctioned, in next step S36, the output port for relay driving in CPU 302 is cleared to turn relay circuit 306 OFF, so that the supply of battery voltage (power source voltage) to motor drive circuit 305 is shut off.

As a result, the current IVEL of DC servo motor 121 is made to be zero so that the driving of DC servo motor 121 can be reliably stopped.

Figure 16:
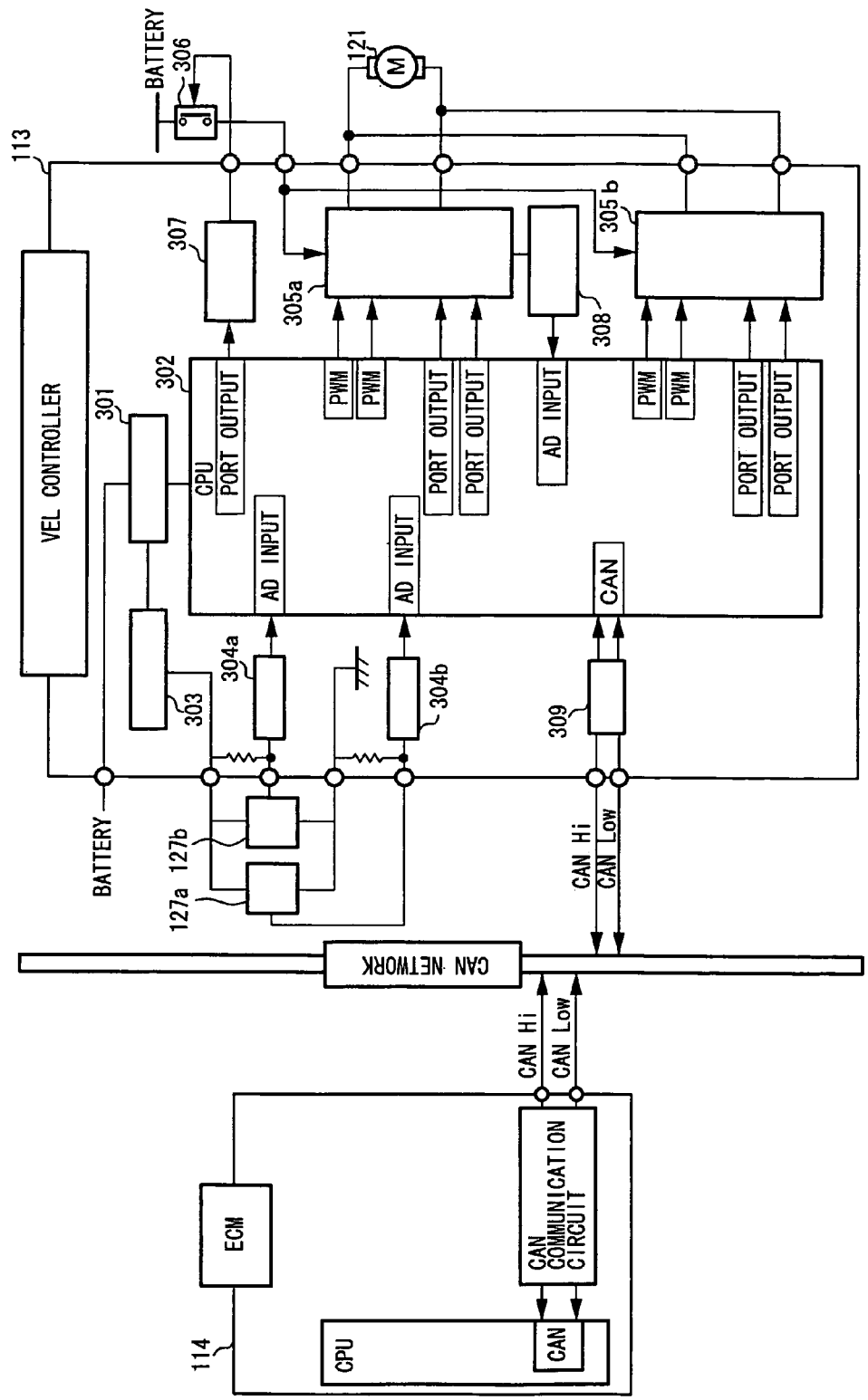
FIG. 16 is a circuit block diagram showing a second embodiment of the VEL controller.

FIG. 16 shows a second embodiment of VEL controller 113.

VEL controller 113 shown in FIG. 16 differs from VEL controller 113 shown in FIG. 11 only in that a first motor drive circuit 305a (main drive circuit) and a second drive circuit 305b (sub drive circuit) are provided as the motor drive circuit.

Both first and second motor drive circuits 305a and 305b are supplied with the battery voltage via relay circuit 306, and only first motor drive circuit 305a is provided with current detection circuit 308.

Figure 17:
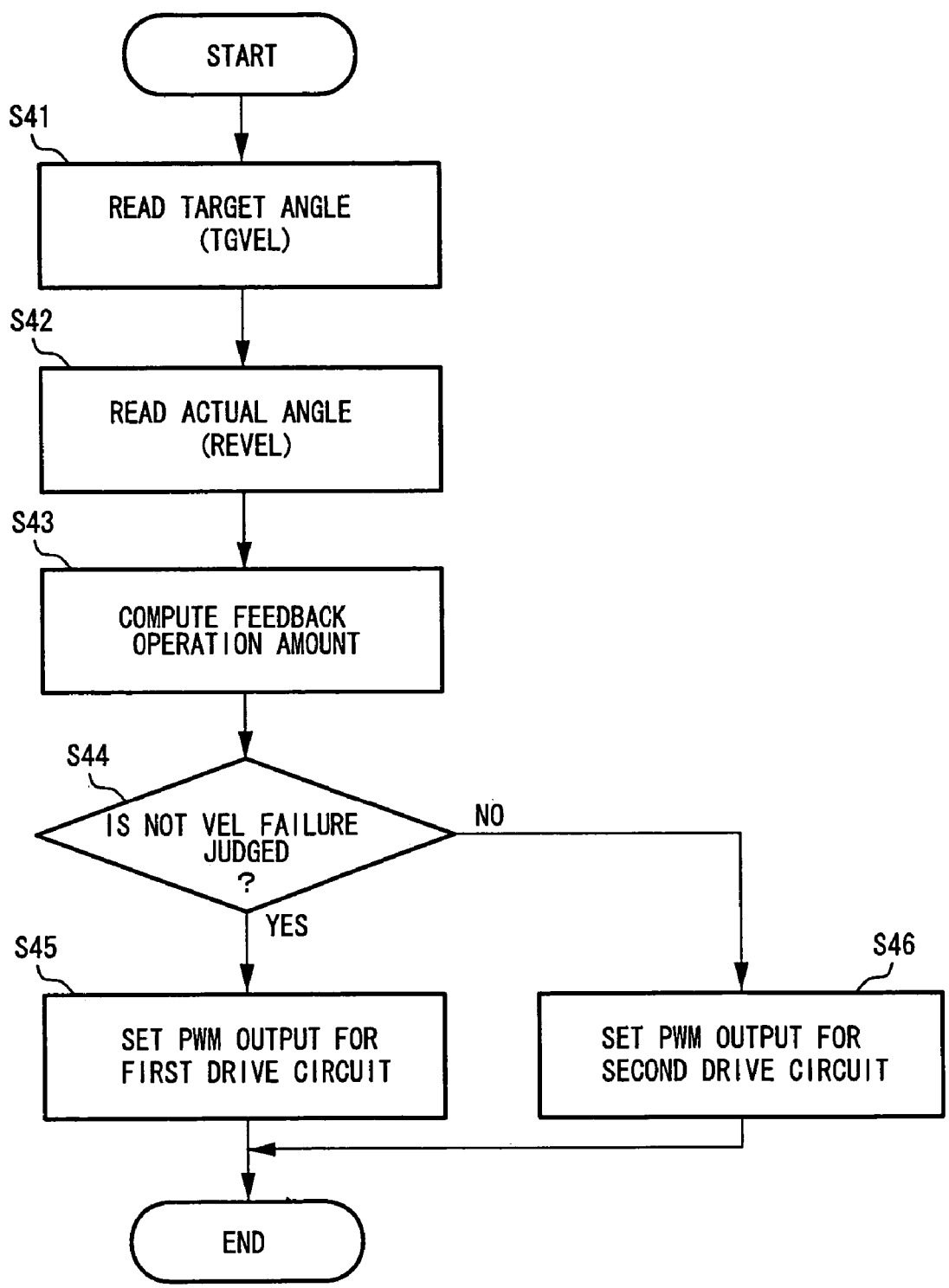
FIG. 17 is a flowchart showing a control by the VEL controller shown in FIG. 16.
Figure 18:
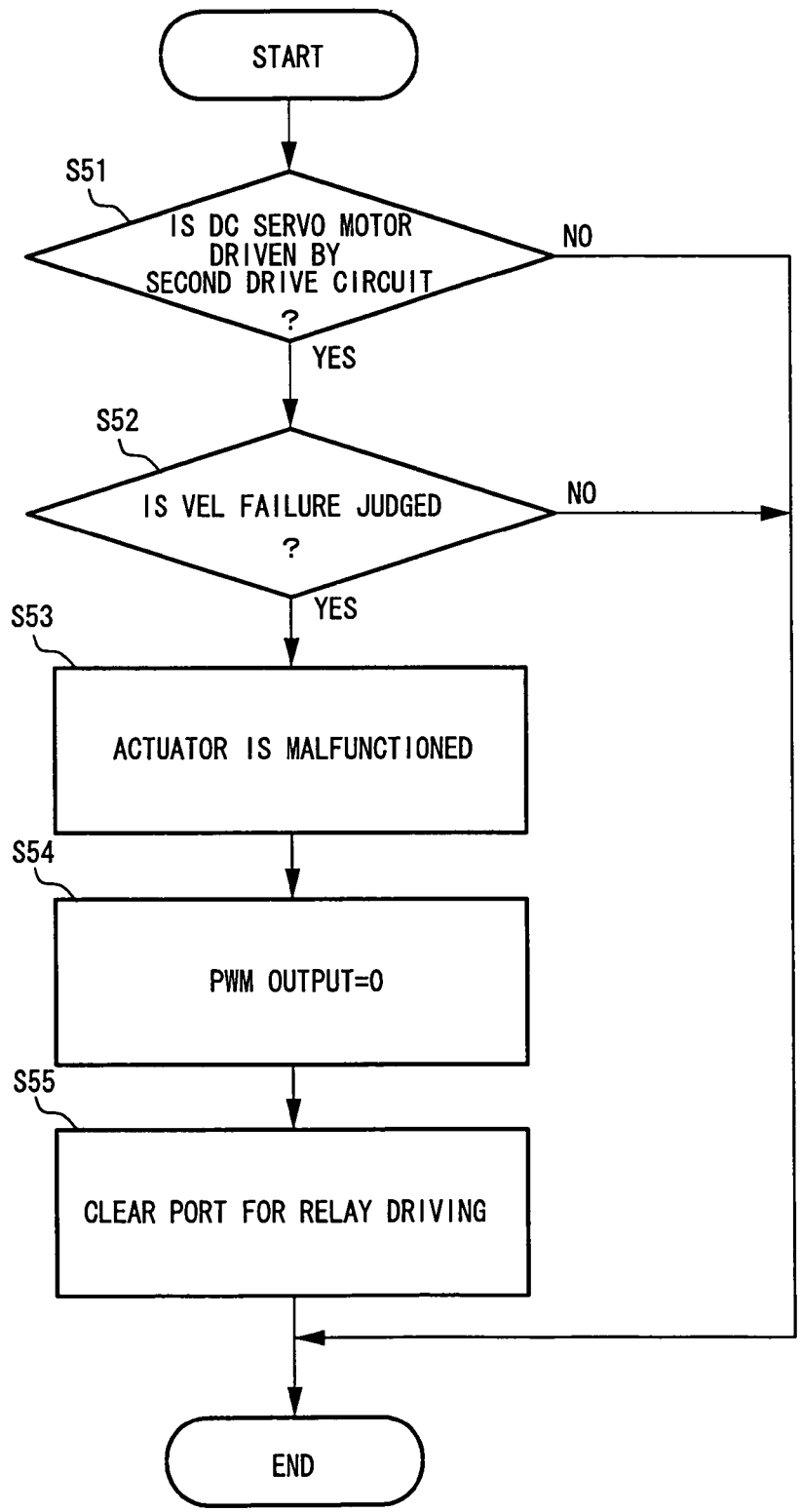
FIG. 18 is a flowchart showing the control by the VEL controller shown in FIG. 16.

Flowcharts in FIG. 17 and FIG. 18 show fail-safe controls by VEL controller 113 shown in FIG. 16.

In the flowchart of FIG. 17, in step S41, the target angle (target VEL angle) of control shaft 16 is computed.

Note, VEL controller 113 can read therein the data of target angle computed in ECM 114.

In step S42, the actual angle of control shaft 16 is detected based on the output signal from angle sensor 127.

In step S43, the feedback operating amount is computed based on the deviation between the target angle and the actual angle.

In step S44, it is determined whether or not the failure of VEL mechanism 112 is judged.

Then, when it is determined that the failure of VEL mechanism 112 is not judged, control proceeds to step S45, where an output of the pulse width modulated signal PWM is set in order to drive DC servo motor 121 by first motor drive circuit 305a.

On the other hand, when it is determined that the failure of VEL mechanism 12 is judged, control proceeds to step S46, where the output of the pulse width modulated signal PWM is set in order to drive DC servo motor 121 by second motor drive circuit 305b.

In the case where the failure judgment of VEL mechanism 112 is caused by the failure of first motor drive circuit 305a, by switching the drive circuit from first motor drive circuit 305a to second motor drive circuit 305b, the failed condition is dissolved.

On the other hand, in the flowchart of FIG. 18, in step S51, it is judged whether or not DC servo motor 112 is driven by second motor drive circuit 305b.

In the case where DC servo motor 121 is driven by second motor drive circuit 305b, control proceeds to step S52.

In step S52, it is determined whether or not the failure of VEL mechanism 112 is judged.

In the case where it is determined that the failure of VEL mechanism 112 is not judged, as a result that the drive circuit is switched from first motor drive circuit 305a to second motor drive circuit 305b, the failure of VEL mechanism 112 is dissolved.

Namely, the failure judgment of VEL mechanism 112 is caused by the failure of first motor drive circuit 305a, and therefore, the driving control of DC servo motor 121 can be performed normally by using second motor drive circuit 350b. Accordingly, the present control routine is terminated at the present step, in order to continue the driving control condition using second motor drive circuit 305b.

On the other hand, in the case where it is determined that the failure of VEL mechanism 112 is judged, the drive circuit does not cause the failure of VEL mechanism 112. Therefore, control proceeds to step S53, where it is judged that DC servo motor 121 (electric actuator) itself is failed.

When it is judged in step S53 that DC servo motor 121 (electric actuator) is failed, in next step S54, the output of the pulse width modulated signal PWM is made to be zero.

Further, in step S55, the output port for relay driving in CPU 302 is cleared, to shut off the power supply to first and second motor drive circuits 305a and 305b, thereby stopping the driving of DC servo motor 121.

Figure 19:
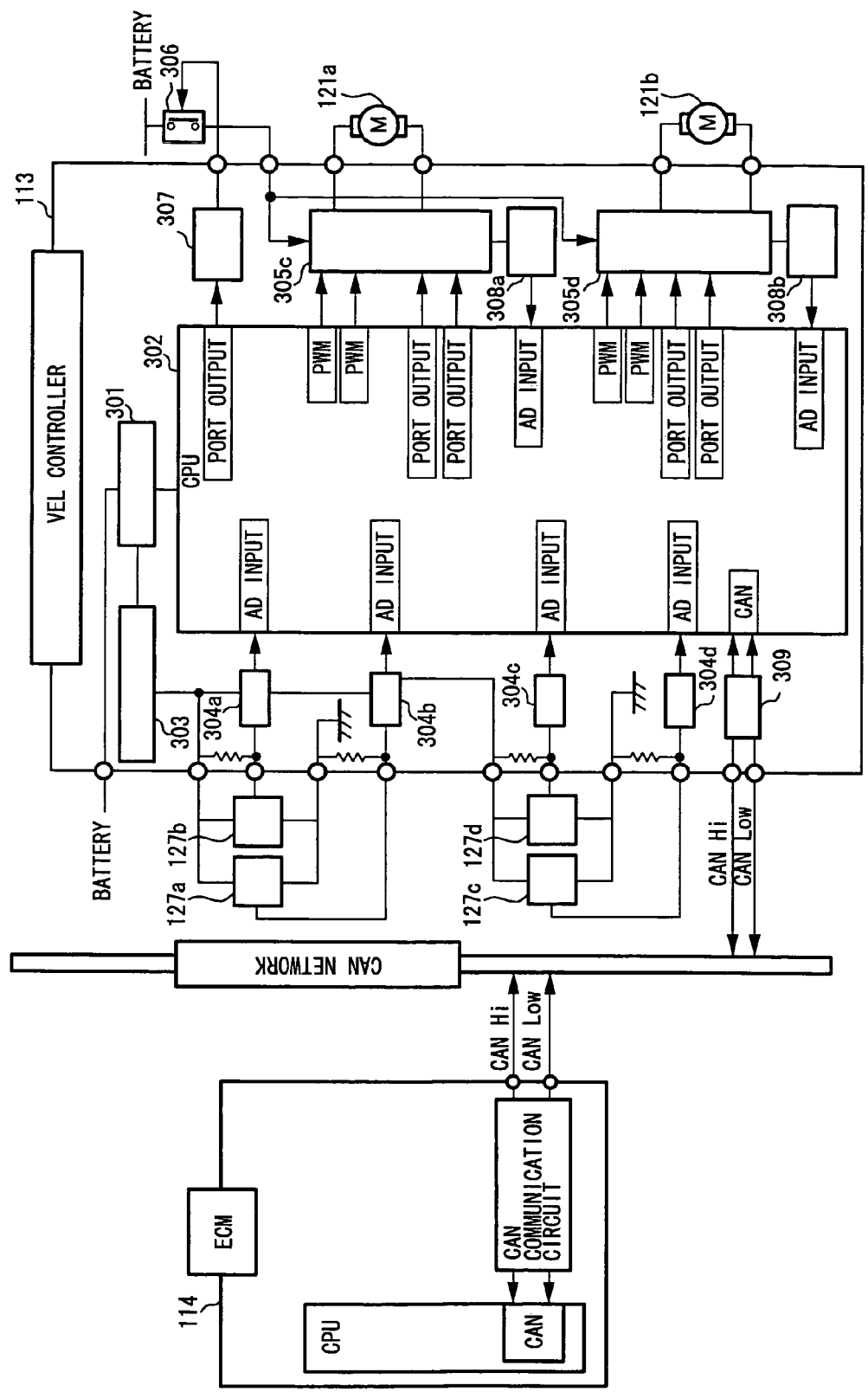
FIG. 19 is a circuit block diagram showing a third embodiment of the VEL controller.

FIG. 19 shows a third embodiment of VEL controller 113.

In the third embodiment, engine 101 is a V-type engine having the right and left banks, and VEL mechanism 112 is disposed on each bank.

Angle sensors 127a, 127b are disposed as angle sensors detecting the angle of control shaft 16 in VEL mechanism 112 on the right bank, and outputs from these angle sensors 127a, 127b are input to CPU 302 via input circuits 304a, 304b, respectively.

On the other hand, angle sensors 127c and 127d are disposed as angle sensors detecting the angle of control shaft 16 in VEL mechanism 112 on the left bank, and outputs from these angle sensors 127c, 127d are input to CPU 302 via input circuits 304c, 304d, respectively.

Further, VEL controller 113 shown in FIG. 19 includes a right bank motor drive circuit 305c driving a DC servo motor 121a (electric actuator) of VEL mechanism 112 for right bank RH, and a left bank motor drive circuit 305d driving a DC servo motor 121b (electric actuator) of VEL mechanism 112 for left bank LH.

Both of right bank motor drive circuit 305c and left bank motor drive circuit 305d are supplied with the battery voltages via relay circuit 306, and also are provided with current detection circuits 308a, 308b.

In VEL controller 113 described above, the control routines shown in the flowcharts of FIG. 13 and FIG. 14 are executed respectively for each bank.

When the control routine shown in the flowchart of FIG. 14 is executed for each bank, in the case where it is judged that either left bank VEL mechanism or right bank VEL mechanism 112 is failed, relay circuit 306 is turned OFF. As a result, the power supply to both of right bank motor drive circuit 305c and left bank motor drive circuit 305d is shut off, so that the valve lift amount at each of the right and left banks is fixed at a minimum.

Accordingly, the valve lift amount is returned to the minimum on one bank where VEL mechanism 112 is failed, while the valve lift amount on the other bank is not controlled normally, and therefore, it is possible to avoid an output difference between both banks.

Figure 20:
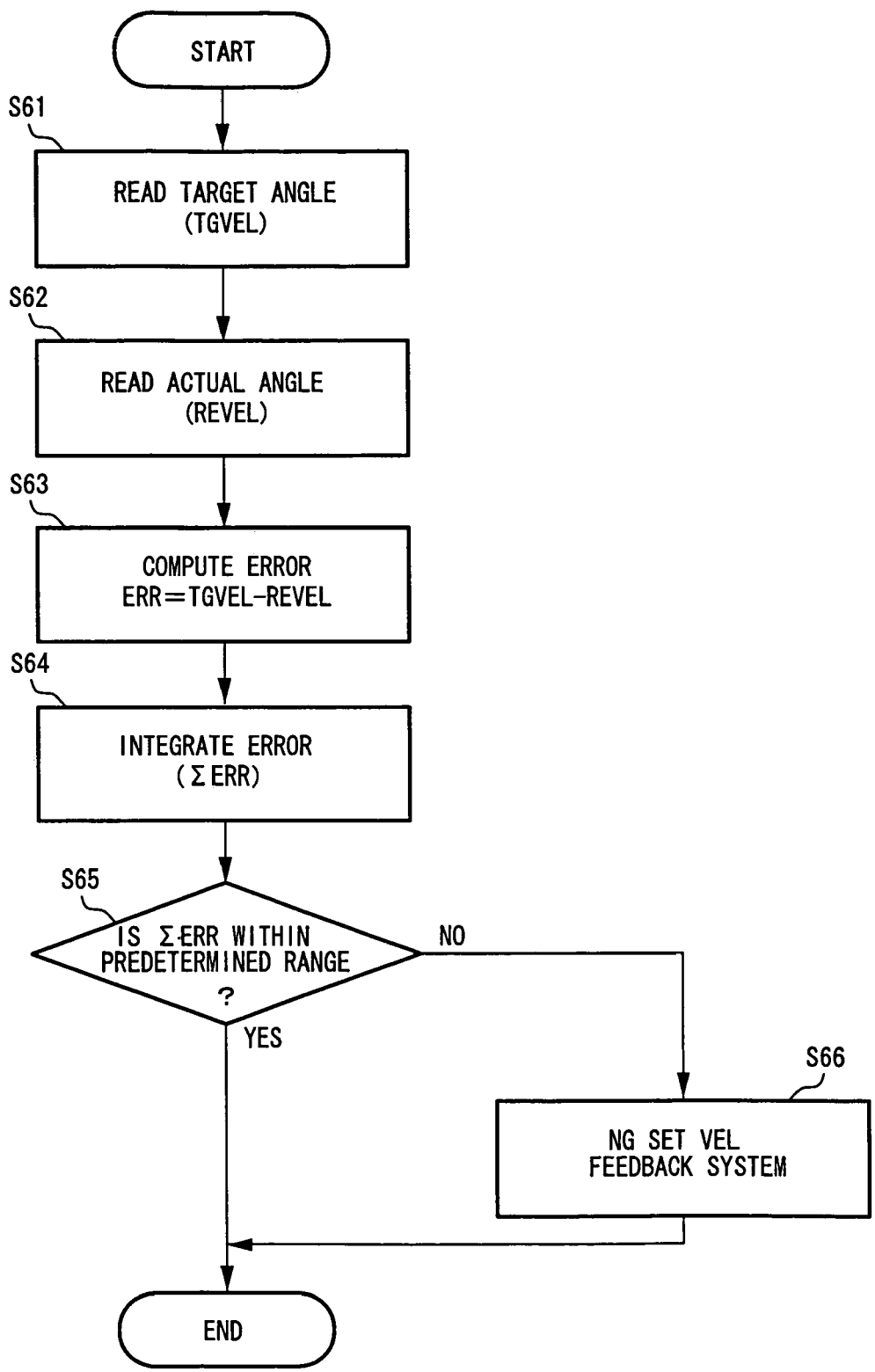
FIG. 20 is a flowchart showing the diagnosis of malfunction in a feedback system in the variable valve event and lift mechanism.
Figure 21:
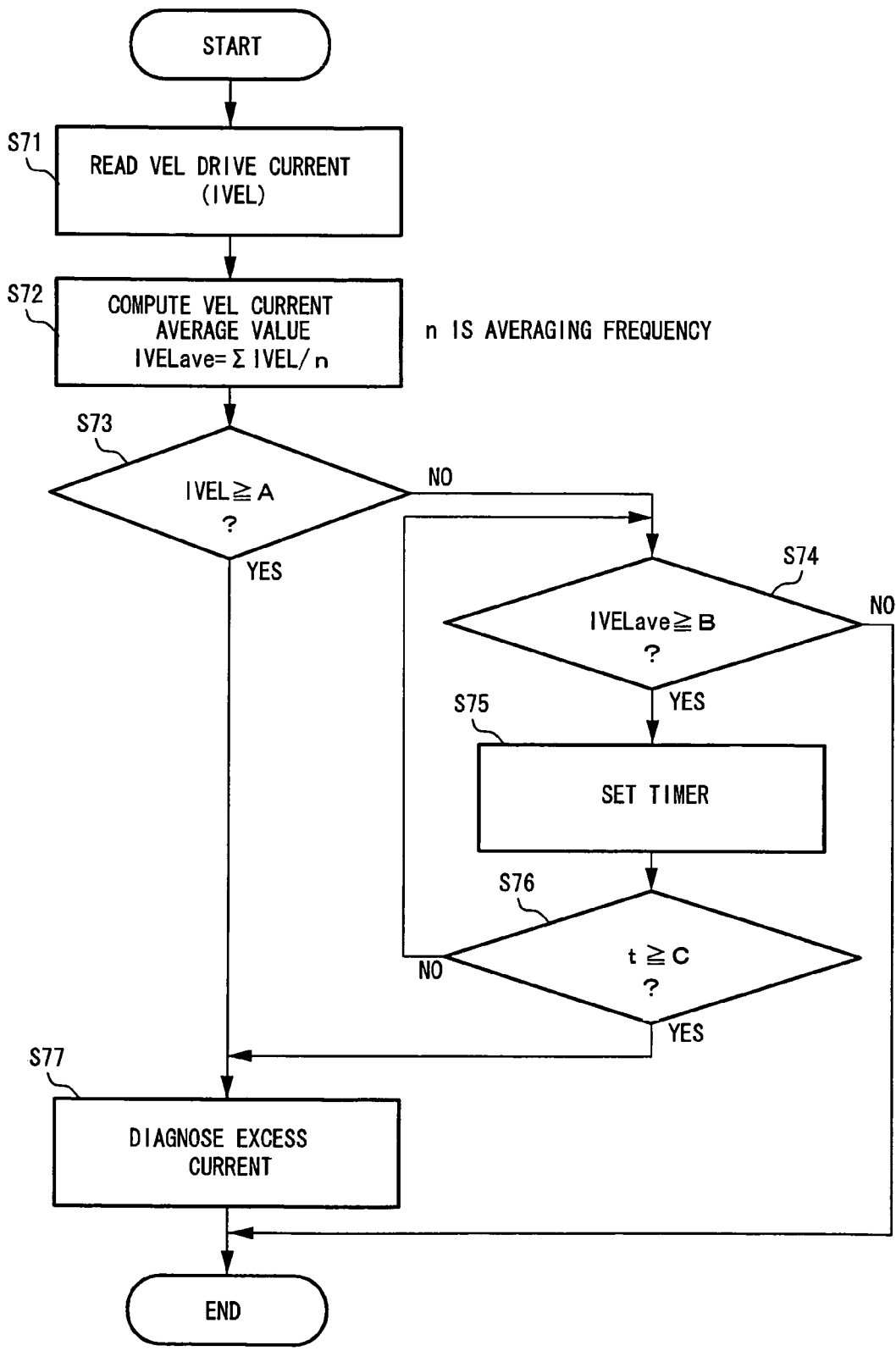
FIG. 21 is a flowchart showing the diagnosis of excess current in a DC servo motor.
Figure 22:
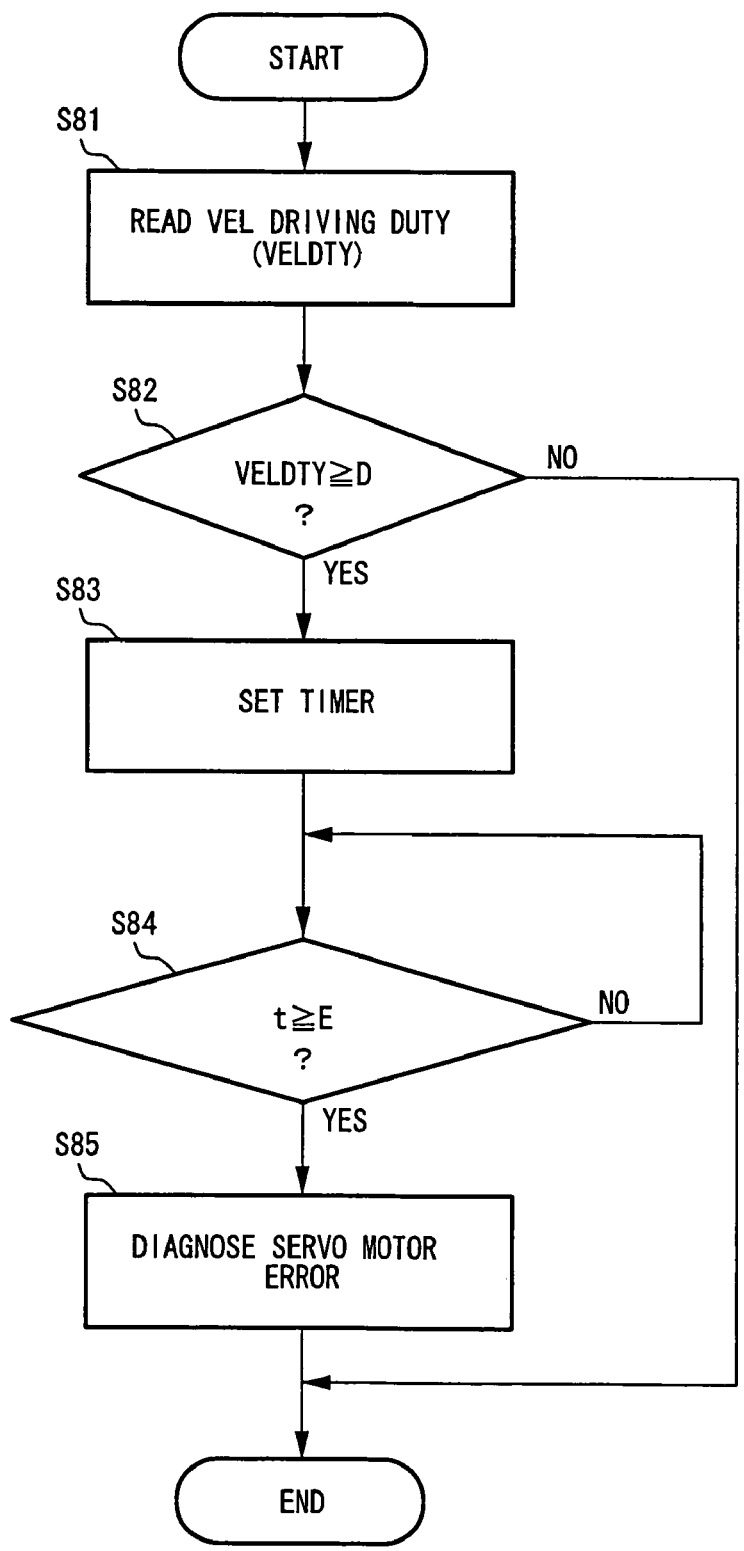
FIG. 22 is a flowchart showing the diagnosis of a servo system in the DC servo motor.

Flowcharts in FIG. 20 to FIG. 22 respectively show examples of a failure judgment method of VEL mechanism 112.

The flowchart in FIG. 20 shows the processing of judging the failure of a feedback system in VEL mechanism 112.

Firstly, in step S61, the target angle of control shaft 16 is computed, and in step S62, the actual angle of control shaft 16 is detected.

Then, in step S63, the deviation between the target angle and the actual angle is computed.

In step S64, the deviation is integrated.

Then, in step S65, it is judged whether or not an integrated value of the deviation is within a predetermined range.

Here, if the integrated value of the deviation is within the predetermined range, it is judged that VEL mechanism 112 is normally feedback controlled, and the control routine is terminated at the present step.

On the other hand, if the integrated value of the deviation is outside the predetermined range, control proceeds to step S66, where it is judged that the feedback system is malfunctioned.

The flowchart in FIG. 21 shows the processing of judging an excess current of DC servo motor 121 (electric actuator).

Firstly, in step S71, the drive current IVEL of DC servo motor 121 (electric actuator) is read.

In step S72, an average value IVELave of the drive current IVEL is computed.

In step S73, it is judged whether or not the drive current IVEL is equal to or larger than a limit value A.

Here, if the drive current IVEL is equal to or larger than the limit value A, control proceeds to step S77, where it is judged that the excess current is generated.

On the other hand, in the case where the drive current IVEL is smaller than the limit value A, control proceeds to step S74.

In step S74, it is judged whether or not the average value IVELave is equal to or larger than a limit value B.

Then, in the case where the average value IVELave is equal to or larger than the limit value B, control proceeds to step S75, where a timer is set, to measure the duration of a state where the average value IVELave is equal to or larger than the limit value B.

In step S76, it is judged whether or not a measured time t by the timer is equal to or longer than a predetermined period of time C.

In the case where the measured time t by the timer is equal to or longer than the predetermined period of time C, that is, in the case the state where the average value IVELave is equal to or larger than the limit value B stays for the predetermined period of time C or exceeds the predetermined period of time C, control proceeds to step S77, where it is judged that the excess current is generated.

The flowchart in FIG. 22 shows the processing of judging the malfunction of a servo system.

Firstly, in step S81, the ON duty VELDTY of DC servo motor 121 is read.

In step S82, it is judged whether or not the ON duty VELDTY is equal to or larger than a predetermined value D.

When the ON duty VELDTY is equal to or larger than the predetermined value D, control proceeds to step S83, where a timer is set in order to measure the duration of a state where the ON duty is equal to or larger than the predetermined value D.

In next step S84, it is judged whether or not a measured time t by the timer is equal to or longer than a predetermined time E.

In the case where the measured time t by the timer is equal to or longer than the predetermined time E, control proceeds to step S85, where it is judged that the servo system in VEL mechanism 112 is malfunctioned.

Note, in the above embodiments, VEL mechanism 112 which varies the lift amount of the engine valve has been exemplarily shown as the motion mechanism. However, it is apparent that the motion mechanism is not limited to VEL mechanism 112.

The entire contents of Japanese Patent Application No. 2004-026220 filed on Feb. 3, 2004, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined in the appended claims and their equivalents.

We claim:

1. A driving control apparatus for a motion mechanism, comprising:
    a motion mechanism configured to vary an operation characteristic of an engine valve, said motion mechanism being disposed in an engine;
    a motor configured to operate said motion mechanism;
    a drive circuit configured to drive said motor; and
    a control unit configured to:
        output a control signal to said drive circuit;
        detect whether or not said motion mechanism is malfunctioning;
        stop outputting the control signal to said drive circuit when it is detected that said motion mechanism is malfunctioning;
        determine that said drive circuit is malfunctioning when a current of said motor is equal to or larger than a predetermined value after output of said control signal is stopped; and
        stop power supplied to said drive circuit when it is determined that said drive circuit is malfunctioning.

2. A driving control apparatus for a motion mechanism according to claim 1, wherein said control unit:
    further performs computation on the control signal to be output to said drive circuit, so as to coincide a controlled variable of said motion mechanism with a target value, and
    judges that said motion mechanism is malfunctioning when an integral value of a deviation between said controlled variable and the target value is outside a predetermined range.

3. A driving control apparatus for a motion mechanism according to claim 1, wherein said control unit judges that said motion mechanism is malfunctioning when the current of said motor exceeds a limit current, and
    wherein said control unit judges that said motion mechanism is malfunctioning when the state where an average current of said motor exceeds an average limit value stays for a predetermined period of time.

4. A driving control apparatus for a motion mechanism according to claim 1, wherein said drive circuit controls the current of said motor in response to a PWM control signal,
    wherein said control unit computes said PWM control signal, which is output to said drive circuit, so as to coincide a controlled variable of said motion mechanism with a target value, and
    wherein said control unit judges that said motion mechanism is malfunctioning when a state where an ON duty of said PWM control signal exceeds a predetermined value stays for a predetermined period of time.

5. A control method of a driving apparatus for a motion mechanism, said apparatus being provided with: a motion mechanism configured to vary an operation characteristic of an engine valve, said motion mechanism being disposed in an engine; a motor configured to operate said motion mechanism; and a drive circuit configured to drive said motor by inputting a control signal, the control method comprising the steps of:
    detecting whether or not said motion mechanism is malfunctioning;
    stopping outputting of the control signal to said drive circuit when it is detected that said motion mechanism is malfunctioning;

determining that said drive circuit is malfunctioning when a current of said motor is equal to or larger than a predetermined value after output of said control signal is stopped; and stopping power supplied to said drive circuit when it is determined that said drive circuit is malfunctioning.

6. A driving control apparatus for a motion mechanism, comprising:

a motion mechanism configured to vary an operation characteristic of an engine valve, said motion mechanism being disposed in an engine;

a motor that operates said motion mechanism;

a drive circuit that drives said motor;

control means for outputting a control signal to said drive circuit;

detecting means for detecting whether or not said motion mechanism is malfunctioning;

a first stopping means for stopping outputting of the control signal to said drive circuit when it is detected that said motion mechanism is malfunctioning;

a determining means for determining that said drive circuit is malfunctioning when a current of said motor is equal to or larger than a predetermined value after output of said control signal is stopped; and a second stopping means for stopping power supplied to said drive circuit when it is determined that said drive circuit is malfunctioning.

* * * * *

UNITED STATES PATENT AND TRADEMARK OFFICE
CERTIFICATE OF CORRECTION

PATENT NO. : 7,623,328 B2
APPLICATION NO. : 11/047588
DATED : November 24, 2009
INVENTOR(S) : Machida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 107 days.

Signed and Sealed this

Fourteenth Day of December, 2010

David J. Kappos
*Director of the United States Patent and Trademark Office*